United States Patent
Kim et al.

(10) Patent No.: US 11,864,135 B2
(45) Date of Patent: *Jan. 2, 2024

(54) METHOD AND DEVICE FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Seonwook Kim, Seoul (KR); Sukhyon Yoon, Seoul (KR); Hyunsoo Ko, Seoul (KR); Suckchel Yang, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,823

(22) Filed: Jan. 9, 2023

(65) Prior Publication Data
US 2023/0164714 A1 May 25, 2023

Related U.S. Application Data

(63) Continuation of application No. 17/711,571, filed on Apr. 1, 2022, now Pat. No. 11,601,905, which is a
(Continued)

(30) Foreign Application Priority Data

Oct. 2, 2019 (KR) .................. 10-2019-0122676
Nov. 7, 2019 (KR) .................. 10-2019-0141806
(Continued)

(51) Int. Cl.
*H04W 56/00* (2009.01)
*H04W 24/08* (2009.01)

(52) U.S. Cl.
CPC ......... *H04W 56/001* (2013.01); *H04W 24/08* (2013.01); *H04W 56/0035* (2013.01)

(58) Field of Classification Search
CPC .................. H04W 56/001; H04W 56/0035
See application file for complete search history.

(56) References Cited

U.S. PATENT DOCUMENTS 11,604,905 B1 * 3/2023 Prichard-Fox ..... G06Q 30/0633
2019/0159180 A1   5/2019 Ly et al.
(Continued)

FOREIGN PATENT DOCUMENTS

CN    109803402    5/2019
CN    110034891    7/2019
(Continued)

OTHER PUBLICATIONS

Elsevier [online], "5G NR The Next Generation Wireless Access Technology," Jun. 2019, retrieved on Feb. 12, 2021, retrieved from URL<https://www.elsevier.com/books/5g-nr-t he-next-generation-wireless-access-technology/dahlman/978-0-12-814323-0/>, 400 pages, *pp. 319-321*.
(Continued)

*Primary Examiner* — Donald L Mills
(74) *Attorney, Agent, or Firm* — Fish & Richardson P.C.

(57) ABSTRACT

The present invention relates to a wireless communication system and particularly to a method and a device therefor, the method comprising the steps of: detecting an SSB, the SSB comprising 15 kHz-granularity-based offset information; determining, on the basis of the 15 kHz-granularity-based offset information, a subcarrier offset used to identify the frequency position of a CORESET linked to the SSB; and monitoring, on the basis of the subcarrier offset, the CORESET linked to the SSB.

8 Claims, 26 Drawing Sheets

Related U.S. Application Data continuation of application No. PCT/KR2020/013519, filed on Oct. 5, 2020.

(60) Provisional application No. 63/012,029, filed on Apr. 17, 2020.

(30) Foreign Application Priority Data

| | | |
|---|---|---|
| Nov. 8, 2019 | (KR) | 10-2019-0142507 |
| Mar. 3, 2020 | (KR) | 10-2020-0026307 |
| Mar. 6, 2020 | (KR) | 10-2020-0028488 |

(56) References Cited

U.S. PATENT DOCUMENTS

| | | |
|---|---|---|
| 2019/0191457 A1 | 6/2019 | Si et al. |
| 2020/0084739 A1 | 3/2020 | Si et al. |
| 2021/0058931 A1 | 2/2021 | Da et al. |
| 2021/0297966 A1* | 9/2021 | Noh .................. H04L 5/0048 |
| 2021/0351968 A1 | 11/2021 | Liu |
| 2022/0116912 A1* | 4/2022 | Si .................. H04L 5/0082 |
| 2022/0132346 A1* | 4/2022 | Oh .................. H04W 56/001 |
| 2022/0174624 A1 | 6/2022 | Wu et al. |
| 2023/0092255 A1* | 3/2023 | Noh .................. H04W 56/006 |

FOREIGN PATENT DOCUMENTS

| | | |
|---|---|---|
| KR | 101999702 | 7/2019 |
| WO | WO 2019055804 | 3/2019 |
| WO | WO 2019161767 | 8/2019 |

OTHER PUBLICATIONS

Ericsson, "SSB raster design of Rel-16 NR-U for 5GHz band," R4-1912017, Presented at 3GPP TSG-RAN4 Meeting #92bis, Chongqing, China, Oct. 14-18, 2019, 8 pages.

Extended European Search Report in European Appln. No. 20871010.3, dated Oct. 12, 2022, 13 pages.

Qualcomm Incorporated, "Email discussion summary on email discussion on k_SSB indication in PBCH for SSB on sync," R1-2002915, Presented at 3GPP TSG RAN WG1 Meeting #100bis-e, Apr. 20-Apr. 30, 2020, 5 pages.

Office Action in Chinese Appln. No. 202080069506.1, dated Mar. 14, 2023, 15 pages (with English translation).

* cited by examiner

Carrier aggregation between L-band and U-band

Standalone U-band(s)

FIG. 9

| | slot #0 | slot #1 | slot #2 | slot #3 | slot #4 | slot #5 | slot #6 | slot #7 | slot #8 | slot #9 |
|---|---|---|---|---|---|---|---|---|---|---|
| SS/PBCH block candidate position index | 0 1 | 2 3 | 4 5 | 6 7 | 8 9 | 10 11 | 12 13 | 14 15 | 16 17 | 18 19 |
| PBCH DMRS sequence index | 0 1 | 2 3 | 4 5 | 6 7 | 0 1 | 2 3 | 4 5 | 6 7 | 0 1 | 2 3 |
| PBCH payload indication | 0 0 | 0 0 | 0 0 | 0 0 | 1 1 | 1 1 | 1 1 | 1 1 | 2 2 | 2 2 |
| SS/PBCH block index (Q = 4) | #0 | #2 | #0 | #2 | #0 | #2 | #0 | #2 | #0 | #2 |

← DRS transmission window →

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is a continuation of U.S. application Ser. No. 17/711,571, filed on Apr. 1, 2022, which is a continuation of International Application No. PCT/KR2020/013519, filed on Oct. 5, 2020, which claims the benefit of U.S. Provisional Application No. 63/012,029, filed on Apr. 17, 2020, and Korean Application Nos. 10-2020-0028488, filed on Mar. 6, 2020, 10-2020-0026307, filed on Mar. 3, 2020, 10-2019-0142507, filed on Nov. 8, 2019, 10-2019-0141806, filed on Nov. 7, 2019, and 10-2019-0122676, filed on Oct. 2, 2019. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method performed by a user equipment (UE) in a wireless communication system is provided. The method may include: detecting a synchronization signal block (SSB), wherein the SSB may include 15 kHz-granularity-based offset information; determining a subcarrier offset used to identify a frequency location of a control resource set (CORESET) related to the SSB based on the 15 kHz-granularity-based offset information; and monitoring the CORESET related to the SSB based on the subcarrier offset. Based on detection of the SSB in an unlicensed band, (1) a difference between a synchronization raster in the unlicensed band and a center frequency of the SSB may be limited to a multiple of 30 kHz, and (2) the subcarrier offset may indicate only a multiple of 30 kHz based on the 15 kHz-granularity-based offset information.

In another aspect of the present disclosure, a UE for use in a wireless communication system is provided. The UE may include: at least one processor; and at least one computer memory operably connected to the at least one processor and configured to, when executed, cause the at least one processor to perform operations. The operations may include: detecting an SSB, wherein the SSB may include 15 kHz-granularity-based offset information; determining a subcarrier offset used to identify a frequency location of a CORESET related to the SSB based on the 15 kHz-granularity-based offset information; and monitoring the CORESET related to the SSB based on the subcarrier offset. Based on detection of the SSB in an unlicensed band, (1) a difference between a synchronization raster in the unlicensed band and a center frequency of the SSB may be limited to a multiple of 30 kHz, and (2) the subcarrier offset may indicate only a multiple of 30 kHz based on the 15 kHz-granularity-based offset information.

In still another aspect of the present disclosure, an apparatus for a UE is provided. The apparatus may include: at least one processor; and at least one computer memory operably connected to the at least one processor and configured to, when executed, cause the at least one processor to perform operations. The operations may include: detecting an SSB, wherein the SSB may include 15 kHz-granularity-based offset information; determining a subcarrier offset used to identify a frequency location of a CORESET related to the SSB based on the 15 kHz-granularity-based offset information; and monitoring the CORESET related to the SSB based on the subcarrier offset. Based on detection of the SSB in an unlicensed band, (1) a difference between a synchronization raster in the unlicensed band and a center frequency of the SSB may be limited to a multiple of 30 kHz, and (2) the subcarrier offset may indicate only a multiple of 30 kHz based on the 15 kHz-granularity-based offset information.

In a further aspect of the present disclosure, a computer-readable storage medium having at least one computer program that, when executed, cause at least one processor to perform operations. The operations may include: detecting an SSB, wherein the SSB may include 15 kHz-granularity-based offset information; determining a subcarrier offset used to identify a frequency location of a CORESET related to the SSB based on the 15 kHz-granularity-based offset information; and monitoring the CORESET related to the SSB based on the subcarrier offset. Based on detection of the SSB in an unlicensed band, (1) a difference between a synchronization raster in the unlicensed band and a center frequency of the SSB may be limited to a multiple of 30 kHz, and (2) the subcarrier offset may indicate only a multiple of 30 kHz based on the 15 kHz-granularity-based offset information.

Preferably, based on the detection of the SSB in the unlicensed band, the subcarrier offset may indicate a multiple of 15 kHz.

Preferably, the 15 kHz-granularity-based offset information may include 4 bits of ssb-SubcarrierOffset as least significant bits (LSBs).

Preferably, based on the detection of the SSB in the unlicensed band, the subcarrier offset may be determined to be equal to a value obtained by setting one LSB of the 15 kHz-granularity-based offset information to '0'.

Preferably, based on the detection of the SSB in the unlicensed band, the one LSB of the 15 kHz-granularity-based offset information may be used to identify SSB candidates in a quasi-co-location (QCL) relationship.

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 7 to 9 illustrate synchronization signal block (SSB) structures/transmission;

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
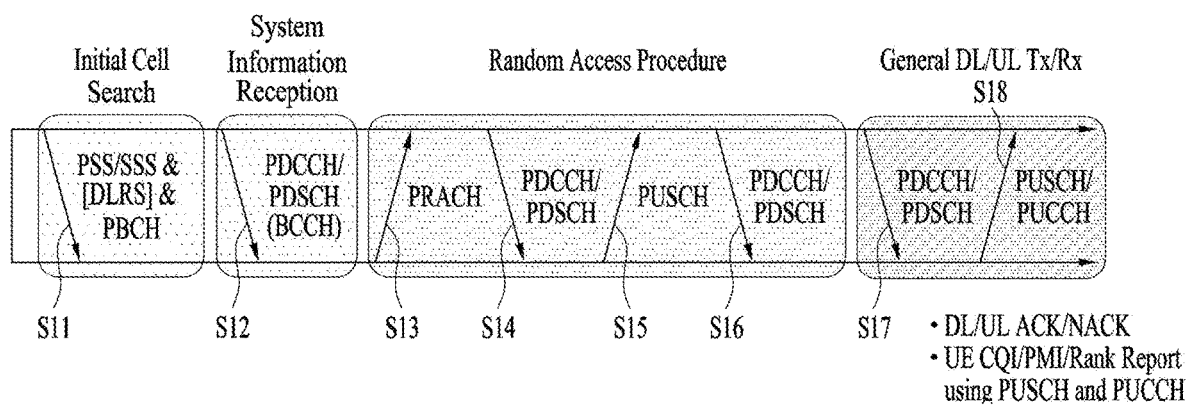
FIG. 1 illustrates physical channels used in a 3rd generation partnership project (3GPP) system as an exemplary wireless communication system and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
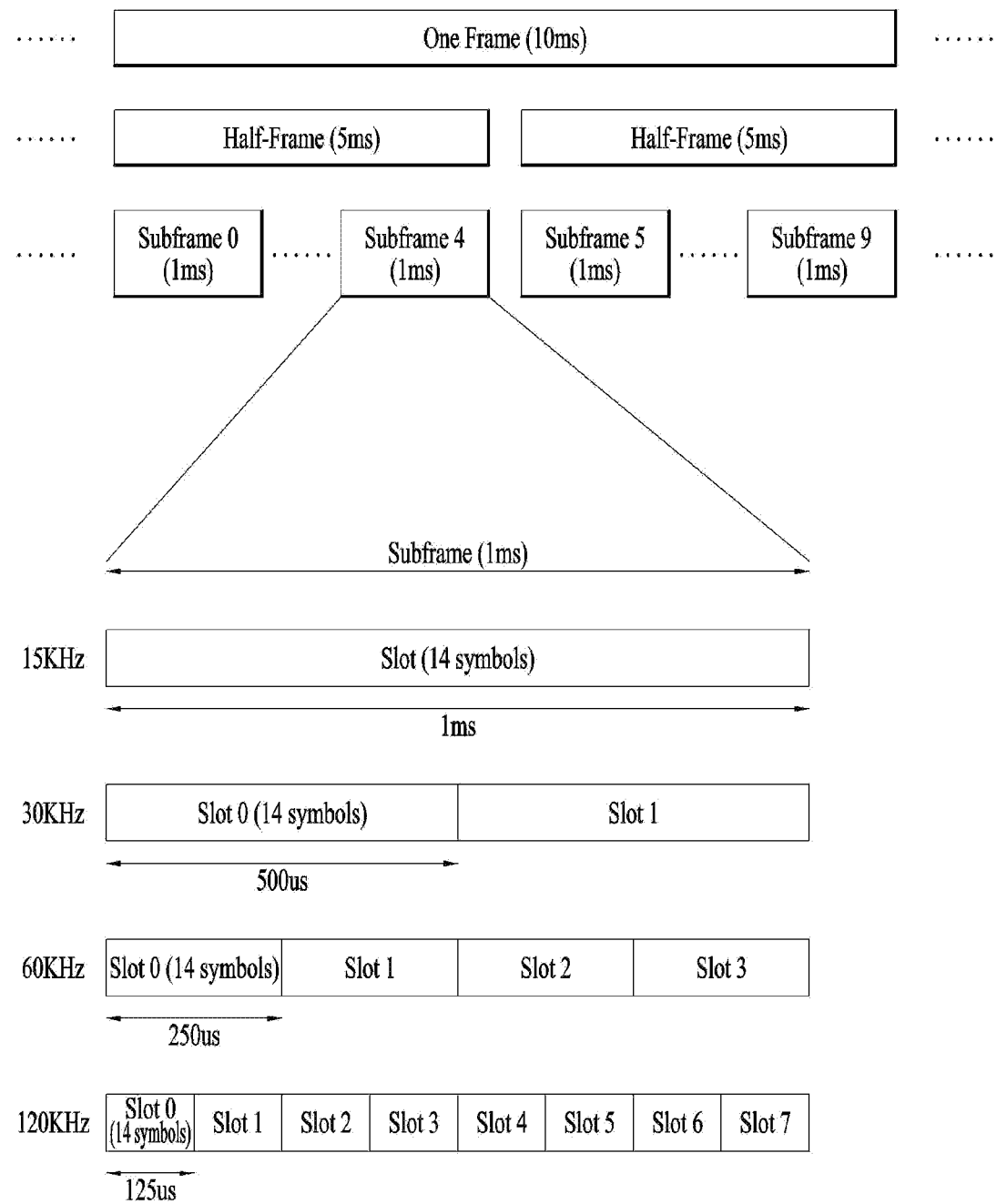
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of 60 kHz or higher, a bandwidth larger than 24.25 GHz is be supported to overcome phase noise.

An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
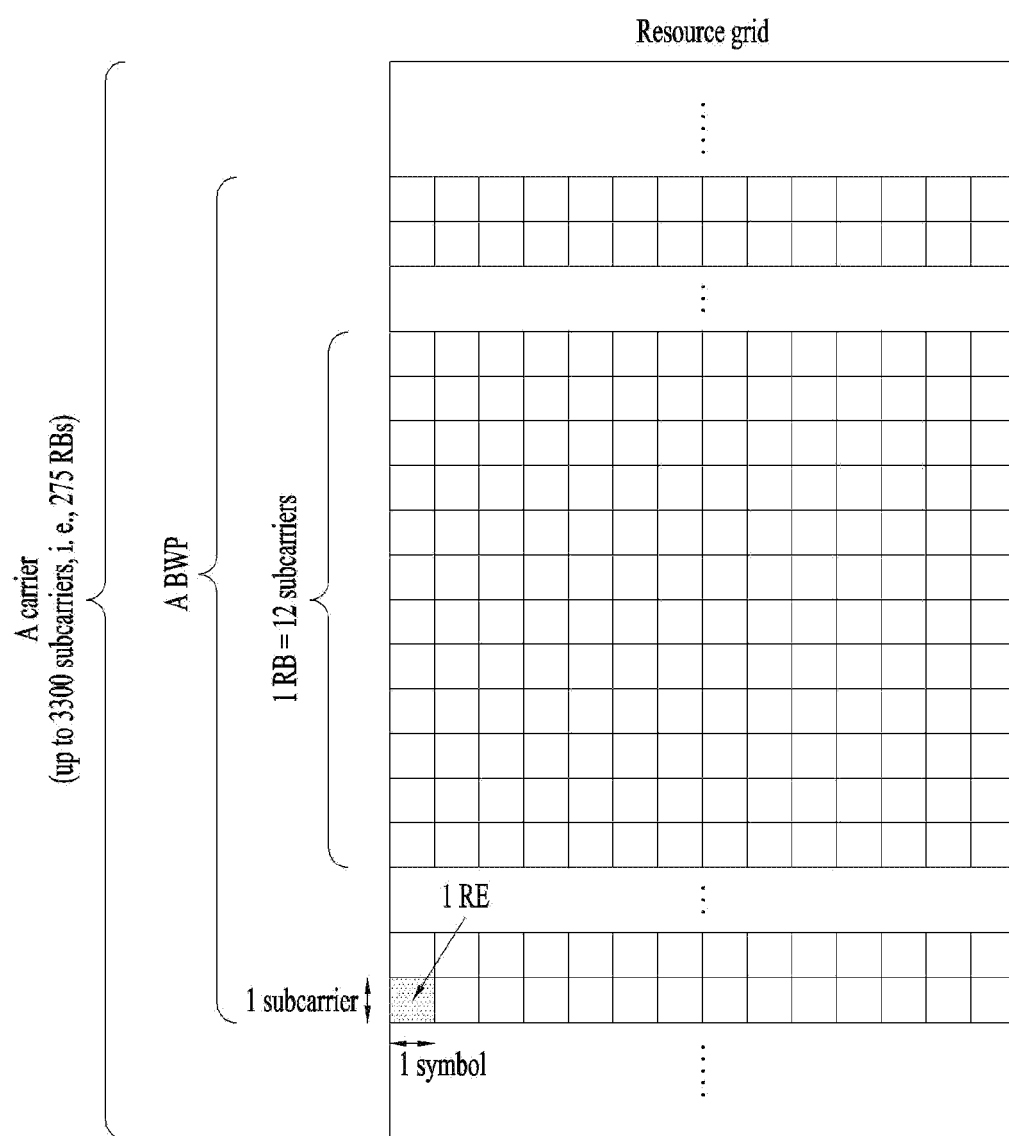
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
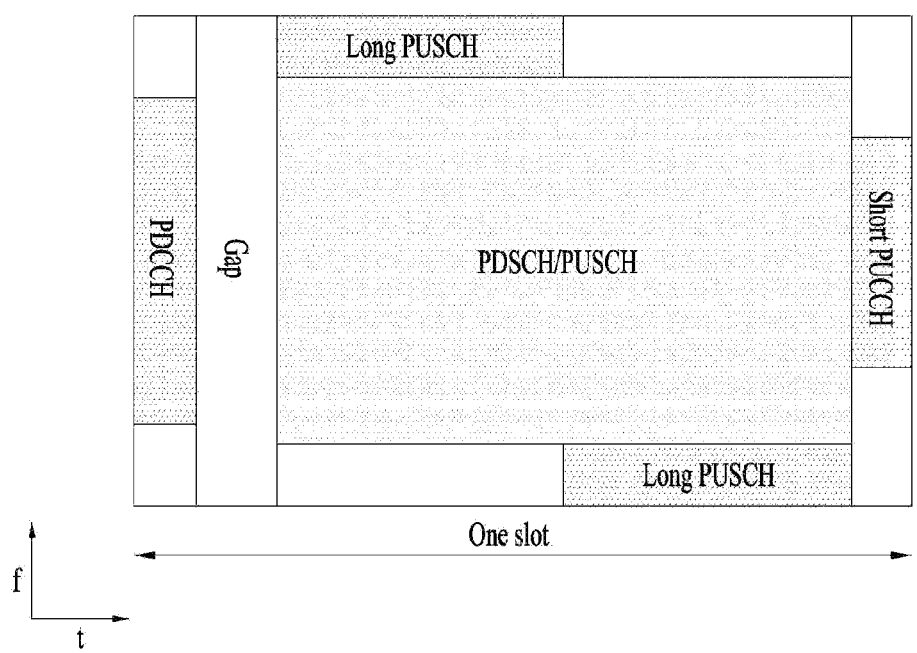
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling (CS), and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may be transmitted in a control resource set (CORESET). The CORESET is defined as a set of resource element groups (REGs) with a given numerology (e.g., SCS, CP length, and so on). A plurality of CORESETs for one UE may overlap with each other in the time/frequency domain. The CORESET may be configured by system information (e.g., master information block (MIB)) or by UE-specific higher layer signaling (e.g., radio resource control (RRC) signaling). Specifically, the number of RBs and the number of symbols (up to 3 symbols) included in the CORESET may be configured by higher layer signaling.

The UE may obtain DCI transmitted over a PDCCH by decoding (blind decoding) a set of PDCCH candidates. The set of PDCCH candidates decoded by the UE is defined as a PDCCH search space set. A search space set may be a common search space (CSS) or a UE-specific search space (USS). The UE may obtain DCI by monitoring PDCCH candidates in one or more search space sets configured by an MIB or higher layer signaling. Each CORESET configuration may be associated with one or more search space sets, and each search space set may be associated with one CORESET configuration. One search space set may be determined based on the following parameters.

controlResourceSetId: A set of control resources related to the search space set monitoringSlotPeriodicityAndOffset A PDCCH monitoring periodicity (in a unit of slot) and a PDCCH monitoring offset (in a unit of slot)

monitoringSymbolsWithinSlot: A PDCCH monitoring pattern (e.g., first symbol(s) in the CORESET) in a PDCCH monitoring slot nrofCandidates: The number of PDCCH candidates (one of 0, 1, 2, 3, 4, 5, 6, and 8) for each AL={1, 2, 4, 8, 16}

Table 4 shows the characteristics of each search space type.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 exemplarily shows DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 5-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Figure 5A:
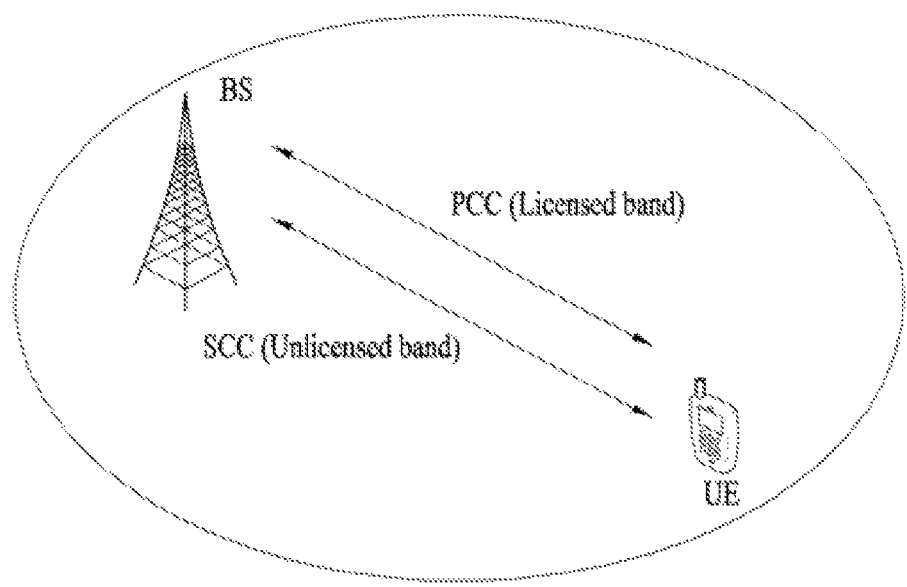
FIGS. 5A and 5B illustrate a wireless communication system supporting an unlicensed band.
Figure 5B:
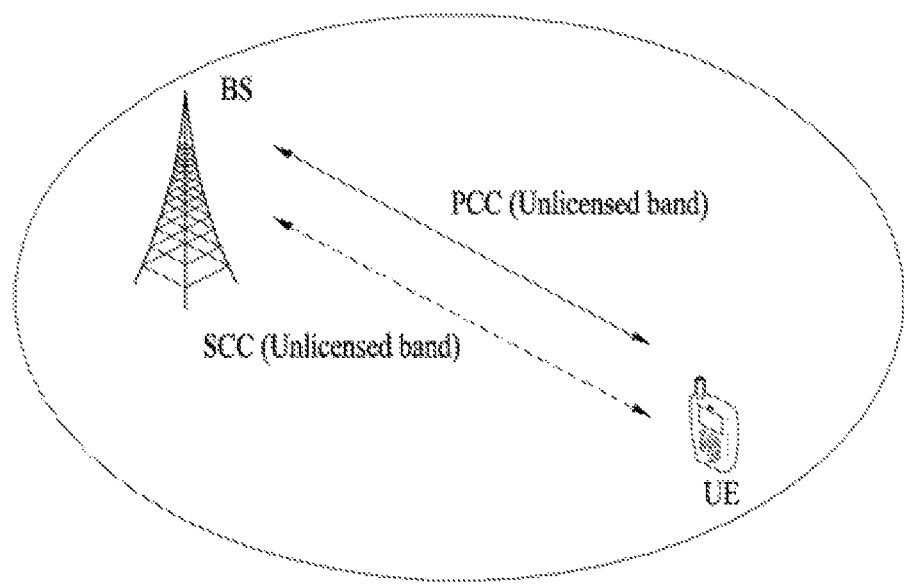

FIGS. 5A and 5B illustrate an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 5A shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 5A corresponds to the LAA of the 3GPP LTE system. FIG. 5B shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

Figure 6:
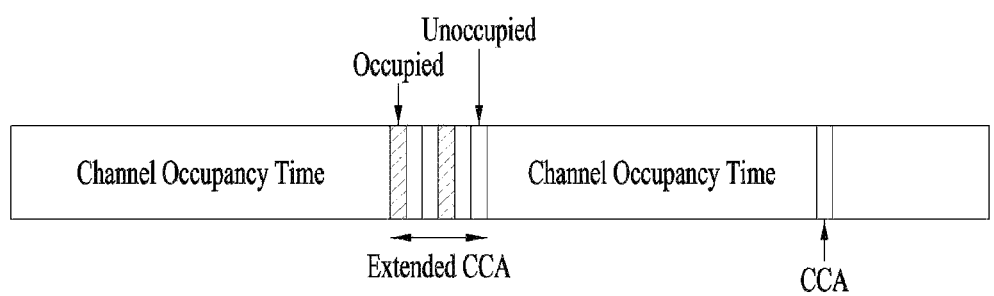
FIG. 6 illustrates a method of occupying resources in an unlicensed band.

FIG. 6 illustrates an exemplary method of occupying resources in an unlicensed band. According to regional regulations for an unlicensed band, a communication node should determine whether other communication node(s) is using a channel in the unlicensed band, before signal transmission. Specifically, the communication node may determine whether other communication node(s) is using a channel by performing carrier sensing (CS) before signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. For reference, the WiFi standard (e.g., 801.11ac) specifies a CCA threshold of −62 dBm for a non-WiFi signal and a CCA threshold of −82 dBm for a WiFi signal. When determining that the channel is idle, the communication node may start signal transmission in a UCell. The above-described series of operations may be referred to as a listen-before-talk (LBT) or channel access procedure (CAP). LBT and CAP may be interchangeably used.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

EMBODIMENTS

Figure 7:
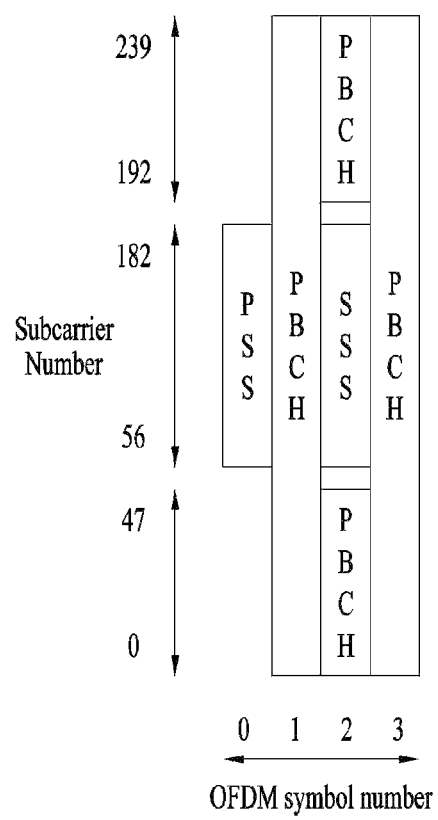

FIG. 7 illustrates the structure of an SSB. A UE may perform cell search, system information acquisition, beam alignment for initial access, DL measurement, and so on based on an SSB. The term SSB is interchangeably used with an SS/PBCH block. The SSB is made up of four consecutive OFDM symbols, each carrying a PSS, a PBCH, an SSS/PBCH, or a PBCH. Each of the PSS and the SSS includes one OFDM symbol by 127 subcarriers, and the PBCH includes 3 OFDM symbols by 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, and three data REs exist between DMRS REs.

Figure 8:
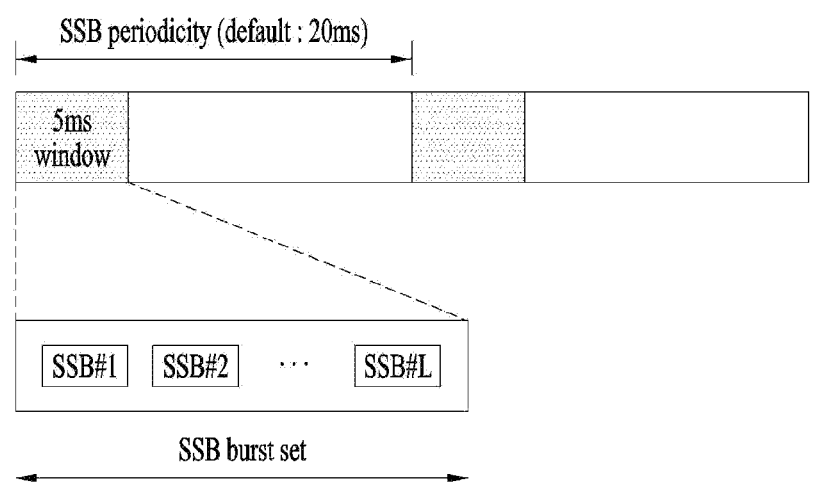

FIG. 8 illustrates exemplary SSB transmission. Referring to FIG. 8, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of candidate SSBs in an SS burst set may be defined as follows according to SCSs. The time positions of candidate SSBs are indexed with (SSB indexes) 0 to L-1 in time order in the SSB burst set (i.e., half-frame). In this document, the term 'candidate SSB' is interchangeably used with the term 'SSB candidate'.

Case A (15 kHz SCS): the starting symbol index of a candidate SSB is given by $\{2, 8\}+14*n$.

For operation without shared spectrum channel access (e.g., licensed band (L-band), licensed cell (LCell), etc.): for a carrier frequency below 3 GHz, n=0 or 1. For a carrier frequency of 3 to 6 GHz, n=0, 1, 2, or 3.

For operation with shared spectrum channel access (e.g., unlicensed band (U-band), unlicensed cell (UCell), etc.): n=0, 1, 2, 3, or 4.

Case B (30 kHz SCS): the starting symbol index of a candidate SSB is given by $\{4, 8, 16, 20\}+28*n$. For a carrier frequency below 3 GHz, n=0. For a carrier frequency of 3 to 6 GHz, n=0 or 1.

Case C (30 kHz SCS): the starting symbol index of a candidate SSB is given by $\{2, 8\}+14*n$.

For operation without shared spectrum channel access: (1) assuming paired spectrum operation, for a carrier frequency below 3 GHz, n=0 or 1, and for a carrier frequency within FR1 and higher than 3 GHz, n=0, 1, 2, or 3; (2) assuming unpaired spectrum operation, for a carrier frequency below 2.4 GHz, n=0 or 1, and for a carrier frequency within FR1 and higher than 2.4 GHz, n=0, 1, 2, or 3.

For operation with shared spectrum channel access: n=0, 1, 2, 3, 4, 6, 7, 8, or 9.

Case D (120 kHz SCS): the starting symbol index of a candidate SSB is given by $\{4, 8, 16, 20\}+28*n$. For a carrier frequency within FR2, n=0, 1, 2, 3, 5, 6, 7, 8, 10, 11, 12, 13, 15, 16, 17, or 18.

Case E (240 kHz SCS): the starting symbol index of a candidate SSB is given by $\{8, 12, 16, 20, 32, 36, 40, 44\}+56*n$. For a carrier frequency within FR2, n=0, 1, 2, 3, 5, 6, 7, or 8.

For operation with shared spectrum channel access, the UE may assume that transmission of SSBs in a half frame is within a discovery burst transmission window starting from the first symbol of the first slot in the half frame. The UE may be provided with the duration of a discovery burst transmission for each serving cell. If no discovery burst transmission window duration is not provided, the UE may assume that the discovery burst transmission window duration is a half frame. For each serving cell, the UE may assume that the repetition periodicity of the discovery burst transmission window is the same as to the repetition periodicity of a half-frame for SSB reception. The UE may assume that among SSBs of the serving cell, SSB(s) having the same value of $(N^{PBCH}_{DM-RS} \mod N^{QCL}_{SSB})$ within the same discovery burst transmission window or over different discovery burst transmission windows among the SSBs of the serving cell are quasi co-located (QCLed), where $N^{PBCH}_{DM-RS}$ denotes the index of a DM-RS sequence for a PBCH, and $N^{QCL}_{SSB}$ may be obtained as follows: (i) $N^{QCL}_{SSB}$ may be provided by ssbPositionQCL-Relationship, or (ii) $N^{QCL}_{SSB}$ may be obtained from an MIB in an SSB according to Table 6 if ssbPositionQCL-Relationship is not provided.

TABLE 6

| subCarrierSpacingCommon | LSB of ssb-SubcarrierOffset | $N^{QCL}_{SSB}$ |
|---|---|---|
| scs15or60 | 0 | 1 |
| scs15or60 | 1 | 2 |
| scs30or120 | 0 | 4 |
| scs30or120 | 1 | 8 | ssbSubcarrierSpacingCommon denotes an SCS of RMSI only for the case of "operation without shared spectrum". The UE may assume that the number of SSBs transmitted on the serving cell within the discovery burst transmission window is not greater than $N^{QCL}_{SSB}$. The UE may determine the index of an SSB according to $(N^{PBCH}_{DM-RS} \mod N^{QCL}_{SSB})$ or $(\tilde{i} \mod N^{QCL}_{SSB})$, where $\tilde{i}$ denotes the index of a candidate SSB. Accordingly, one or more candidate SSBs may correspond to one SSB index. Candidate SSBs corresponding to the same SSB index may be QCLed.

FIG. 9 illustrates an example of SS/PBCH block candidate positions. Specifically, FIG. 9 shows a case where $N^{QCL}_{SSB}$ is set to 4 and ssb-PositionsInBurst is set to '10100000'. In this case, only an SSB with SSB (=SS/PBCH block) index #0/#2 may be transmitted. ssb-PositionsInBurst and $N^{QCL}_{SSB}$ may be used to provide a rate matching pattern within a discovery reference signal (DRS) transmission window (or discovery burst transmission window). For example, the UE may perform rate matching on all SSB candidate position indices QCLed with actually transmitted SSB indices that are provided by ssb-PositionsInBurst. In FIG. 9, the UE may perform rate matching on time/frequency resources of an SSB candidate location index 0/2/4/6/8/10/12/14/16/18. Therefore, when receiving a PDSCH scheduled by a PDCCH with a CRC scrambled by a C-RNTI, MCS-C-RNTI, CS-RNTI, RA-RNTI, MsbB-RNTI, P-RNTI, TC-RNTI, etc. or a PDSCH with SPS (or with a CRC scrambled by an SI-RNTI if a system information indicator in an PDCCH (i.e., DCI) is set to 1), the UE may assume SSB transmission according to ssb-PositionsInBurst if PDSCH resource allocation overlaps with PRBs including SSB transmission resources (e.g. SSB candidate position index 0/2/4/6/8/10/12/14/16/18). That is, the UE may assume that the PRBs including the SSB transmission resources are not available (not mapped to) for the PDSCH in OFDM symbols where the SSB is transmitted.

Figure 10:
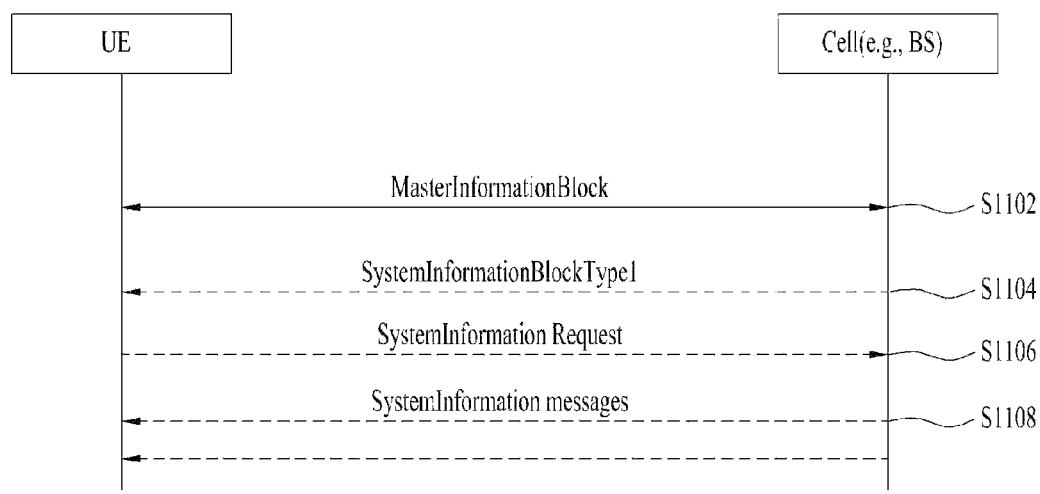
FIG. 10 illustrates a system information acquisition process.

FIG. 10 illustrates a system information (SI) acquisition process. In the NR system, when the UE attempts initial access, the UE may obtain PDCCH configuration information for receiving SI (e.g., SIB1) from a PBCH payload (or MIB) (S1102). In this case, the PDCCH configuration information may mean: (1) information on time/frequency resources of a CORESET (hereinafter, CORESET #0) in which a PDCCH scheduling a PDSCH carrying SI is to be transmitted; and information about a CSS set (hereinafter, Type0-PDCCH CSS set) associated with CORESET #0. Accordingly, the UE may receive the PDCCH (scheduling the PDSCH carrying the SI) based on the PDCCH configuration information and obtain the SI from the PDSCH scheduled by the corresponding PDCCH (S1104). In addition, the UE may send a request for on-demand SI to the BS (S1106) and receive the requested SI (S1108).

SI except for the MIB may be referred to as remaining minimum system information (RMSI). The MIB includes information/parameters related to reception of SIB1 (SystemInformationBlockType1) and is transmitted over a PBCH of an SSB. Information in the MIB may include the following fields, and details thereof may be found in 3GPP TS 38.331.

subCarrierSpacingCommon ENUMERATED {scs15or60, scs30or120},
ssb-SubcarrierOffset INTEGER (0 . . . 15),
pdcch-ConfigSIB1 INTEGER (0 . . . 255),
dmrs-TypeA-Position ENUMERATED {pos2, pos3},
Details of each field are summarized in Table 7.

TABLE 7 pdcch-ConfigSIB1
Determines a common CORESET (i.e., CORESET#0), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.
ssb-SubcarrierOffset
Corresponds to $k_{SSB}$, which is the frequency domain offset between SSB and the overall resource block grid in number of subcarriers.
This field may indicate that this cell does not provide SIB1 and that there is hence no CORESET#0 configured in MIB. In this case, the field pdcch-ConfigSIB1 may indicate the frequency positions where the UE may (not) find a SS/PBCH with a CORESET and search space for SIB1.
Upon detection of a SS/PBCH block, the UE determines that a control resource set for Type0-PDCCH common search space is present if $k_{SSB}$ <= 23 for FR1 (Frequency Range 1; Sub-6 GHz; 450 to 6000 MHz) and if $k_{SSB}$ <=11 for FR2 (Frequency Range 2; mm-Wave; 24250 to 52600 MHz). $k_{SSB}$ represents a frequency/subcarrier offset between subcarrier 0 of SS/PBCH block to subcarrier 0 of common resource block for SSB. For FR2 only values up to 11 are applicable. The UE determines that a control resource set for Type0-PDCCH common search space is not present if $k_{SSB}$ > 23 for FR1 and if $k_{SSB}$ > 11 for FR2.
subCarrierSpacingCommon
Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.
dmrs-TypeA-Position
Position of (first) DM-RS for downlink (e.g., PDSCH) and uplink (e.g., PUSCH). pos2 represents the $2^{nd}$ symbol in a slot and pos2 represents the $3^{rd}$ symbol in a slot.

Figure 11:
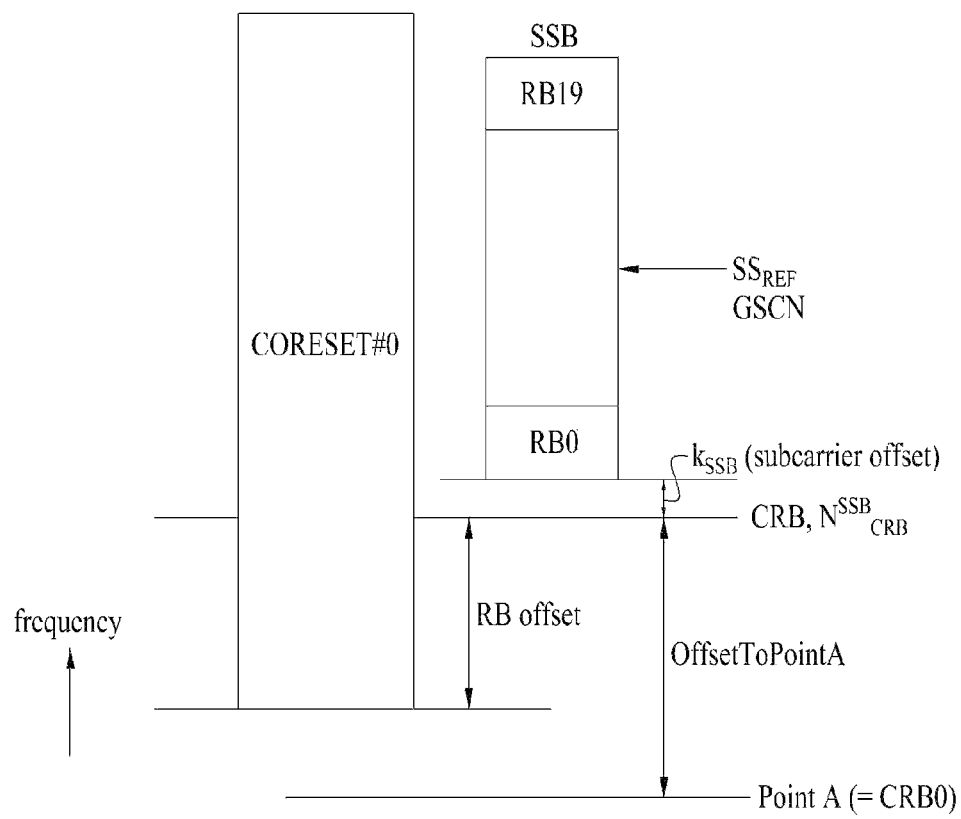
FIG. 11 illustrates the locations of an SSB and a control resource set (CORESET)

FIG. 11 illustrates frequency positions of an SSB and CORESET #0. A channel raster is defined by a subset of RF reference frequencies used to identify an RF channel position. The RF reference frequency is defined for all frequency bands, and the granularity (i.e. frequency spacing) of the RF reference frequency may be, for example, 5 kHz (in the frequency range of 0 to 3000 MHz) and 15 kHz (in the frequency range of 3000 to 24250 MHz). A synchronization raster is a subset of channel rasters and indicates the frequency position of an SSB used by the UE to obtain SI, $SS_{REF}$. $SS_{REF}$ may coincide with the center frequency of 20 PRBs occupied by an SSB. Table 8 shows a relationship between $SS_{REF}$ and a global synchronization channel number (GSCN).

TABLE 8

| Frequency Range | SS Block (SSB) frequency position $SS_{REF}$ | GSCN | Range of GSCN |
|---|---|---|---|
| 0-3000 MHz | N * 1200 kHz + M * 50 kHz, N = 1:2499, M ∈ {1, 3, 5} (Note 1) | 3N + (M − 3)/2 | 2-7498 |
| 3000-24250 MHz | 3000 MHz + N * 1.44 MHz N = 0:14756 | 7499 + N | 7499-22255 |

NOTE 1:
The default value for operating bands with SCS spaced channel raster is M = 3.

After SSB detection, the UE may determine: (i) a plurality of contiguous RBs and one or more contiguous symbols included in a CORESET (e.g., CORESET #0) and; (ii) a PDCCH occasion (i.e., time-domain location for PDCCH reception) (e.g., search space #0) based on information in the MIB (e.g., pdcch-ConfigSIB1). Specifically, pdcch-ConfigSIB1 is 8-bit information. In this case, (i) is determined based on the four most significant bits (MSBs) (or MSB four bits) of pdcch-ConfigSIB1 (see 3GPP TS 38.213 Tables 13-1 to 13-10), and (ii) is determined based on the four least significant bits (LSBs) (or LSB four bits) of pdcch-ConfigSIB1 (see 3GPP TS 38.213 Tables 13-11 to 13-15).

Table 9 shows information indicated by the four MSBs of pdcch-ConfigSIB1.

TABLE 9

| Index | SS/PBCH block and CORESET multiplexing pattern | Number of RBs $N^{CORESET}_{RB}$ | Number of Symbols $N^{CORESET}_{symb}$ | Offset (RBs)* |
|---|---|---|---|---|
| 0 | 1 | 48 | 1 | 2 |
| 1 | 1 | 48 | 1 | 6 |
| 2 | 1 | 48 | 2 | 2 |
| 3 | 1 | 48 | 2 | 6 |
| 4 | 1 | 48 | 3 | 2 |
| 5 | 1 | 48 | 3 | 6 |
| 6 | 1 | 96 | 1 | 28 |
| 7 | 1 | 96 | 2 | 28 |
| 8 | 1 | 96 | 3 | 28 |
| 9-15 | Reserved | | | |

*denotes an offset between the first RB of an SSB and the first RB of an RMSI CORESET.

The position of CORESET #0 in the frequency domain is determined by a subcarrier offset and an RB offset with respect to the SSB. Referring to FIG. 11, $k_{SSB}$ denotes a subcarrier offset from subcarrier #0 of a common resource block (CRB), $N^{SSB}_{CRB}$ to subcarrier #0 of the SSB. Here, $N^{SSB}_{CRB}$ is identified by a higher layer (e.g., RRC) parameter, offsetToPointA, and $k_{SSB}$ is a 5-bit value and consists of: MSB 1 bit of 3 bits of MIB used for candidate SSB indices (=MSB 1 bit of $k_{SSB}$)+4 bits of ssb-Subcarrier-Offset (=LSB 4 bits of $k_{SSB}$). The RB offset denotes an offset from the smallest RB index of CORESET #0 to the smallest RB index of the CRB overlapping with the first RB of the corresponding SSB, which may be determined based on the offset (RB) of Table 9.

As described above, the channel raster is defined with a spacing of 15 kHz in the NR system (in a band above 3 GHz) (see Table 8), and the corresponding value is used by the UE as a reference frequency for signal transmission and reception on a carrier. For example, the channel raster may mean the center frequency of a PRB resource region related to a corresponding carrier/BWP. NR-U may be defined in a 5 and/or 6 GHz band. In an environment where NR-U coexists with Wi-Fi (and/or LTE LAA), the resource region of a carrier/BWP bandwidth may be aligned with that of Wi-Fi. For example, considering that Wi-Fi is defined based on 20-MHz interval channelization such as 5150 to 5170 MHz and 5170 to 5190 MHz, the channel raster value may be defined to be at most aligned with 5150 to 5170 MHz and 5170 to 5190 MHz for a NR-U carrier bandwidth of 20 MHz or at most aligned with 5150 to 5190 MHz for a NR-U carrier bandwidth of 40 MHz. In addition, a specific channel raster value may be selected from among channel raster values defined in NR according to the carrier/BWP bandwidth and related frequency region to be aligned with a Wi-Fi channel (hereinafter, down selection). As an example, for the 20 MHz carrier bandwidth corresponding to 5150 to 5170 MHz or 5170 to 5190 MHz, the channel raster value may be defined as 5160 MHz (corresponding to $N_{REF}$=744000 in Table 8) or 5180.01 MHz ($N_{REF}$=745334 in Table 8). As another example, for the 40 MHz carrier bandwidth corresponding to 5150 to 5190 MHz, the channel raster value may be defined as 5169.99 MHz (corresponding to $N_{REF}$=744666 in Table 8). In addition, in an environment where NR-U does not coexist with Wi-Fi (and/or LTE LAA), all channel raster values with the 15 kHz SCS may be allowed with no down selection, or a plurality of channel raster values may be defined depending on the carrier bandwidth and related frequency region if down selection is performed.

Figure 12:
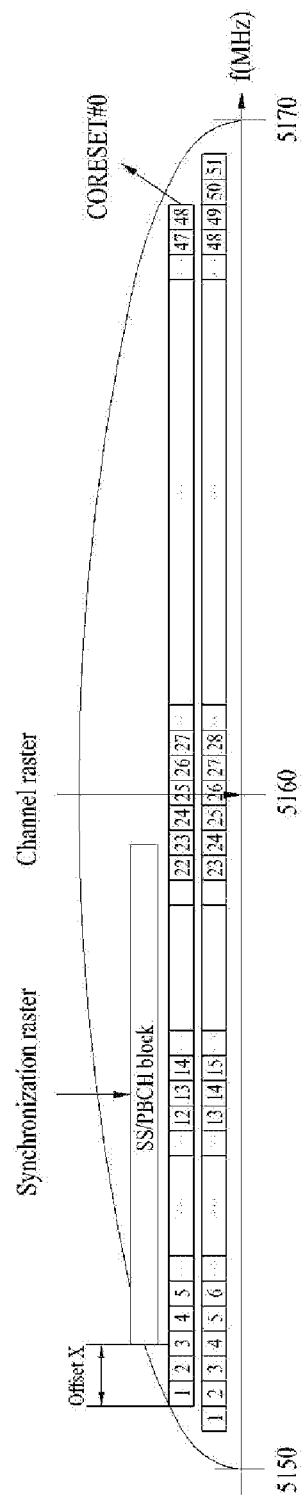
FIGS. 12 to 19 illustrate configurations of am SSB/CORESET according to proposals of the present disclosure.

In NR, the synchronization raster is defined with a sparser density than the channel raster in consideration of UE complexity for SS/PBCH block detection. The synchronization raster may coincide with the center frequency of 20 PRBs occupied by an SS/PBCH block. Some of synchronization raster values with a spacing of 1.44 MHz (defined in NR) may be defined as the synchronization raster for NR-U, which may be defined in the 5 and/or 6 GHz band. Specifically, one synchronization raster value may be defined for each 20 MHz. The corresponding synchronization raster value may be defined to be close to the center frequency of 20 MHz. Alternatively, the corresponding synchronization raster value may be defined such that the SS/PBCH block is located at the end of 20 MHz as much as possible. For example, in a region corresponding to 5150 to 5170 MHz shown in FIG. 12, the synchronization raster value may be defined as 5155.68 MHz (corresponding to GSCN=8996 of Table 8) so that the synchronization raster value belongs to existing synchronization raster candidates of NR and is close to 5150 MHz as much as possible while 20 PRBs of the SS/PBCH block are included in the corresponding region. Also, in the present disclosure, it is basically assumed that the RB grid of the carrier/BWP (consisting of 51 PRBs) is aligned with the RB grid of CORESET #0 (consisting of 48 PRBs) as shown in the example of FIG. 12.

Hereinafter, the present disclosure proposes a method of configuring resources of CORESET #0 for SI acquisition in the NR system operating in an unlicensed band, and a method for a UE to analyze the resources. For example, the present disclosure proposes a method of configuring a resource region of CORESET #0 based on a PBCH payload (or MIB) when a synchronization raster and a channel raster are defined. In addition, the present disclosure proposes a method of configuring a resource region of CORESET #0 based on a PBCH payload (or MIB) in an SS/PBCH block when the SS/PBCH block is transmitted at a center frequency which does not corresponding to the synchronization raster.

The proposed methods of the present disclosure may be applied to only operations in the NR-U system/cell (e.g., shared spectrum). For example, if the system is not the NR-U system/cell (e.g., shared spectrum), the methods proposed in the present disclosure may be combined with methods used in the current NR system 1) Receiver (Entity A) (e.g., UE)

[Method #1] An offset value from a specific RE of an SS/PBCH block (e.g., the first RE in the minimum RB index) to a specific RE of CORESET #0 (e.g., the first RE in the minimum RB index) may be configured by the PBCH payload of the corresponding SS/PBCH block. In this case, the offset value may be defined at the RB and/or RE level, and the RB level offset value may have a range (that varies depending on each frequency band) determined based on the synchronization raster and channel raster defined for NR-U frequency bands. Here, the RE refers to a unit on the frequency axis, and the order of REs may be equivalent to the order of REs in one OFDM symbol. Accordingly, an RE may be replaced with a subcarrier.

When the UE attempts initial access in frequency bands of the NR-U system, the UE may expect an SS/PBCH and CORESET #0 with an SCS of 30 kHz. In this case, the frequency-domain position and time-domain duration of CORESET #0 may be defined the same as those of the current NR system. Table 10 shows sets of RBs and slot symbols of CORESET for a Type0-PDCCH search space set when the SCS of {SS/PBCH block, PDCCH} is {30, 30} kHz for frequency bands with a minimum channel bandwidth of 5 or 10 MHz in the current NR system.

TABLE 10

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 12 |
| 11 | 1 | 48 | 1 | 14 |
| 12 | 1 | 48 | 1 | 16 |
| 13 | 1 | 48 | 2 | 12 |
| 14 | 1 | 48 | 2 | 14 |
| 15 | 1 | 48 | 2 | 16 |

However, the following restrictions may be imposed in NR-U: the number of RBs of 30 kHz CORESET #0 is 48, and the time-domain duration thereof is one or two (OFDM) symbols. In addition, the range of the RB level offset value may be determined by the synchronization raster and channel raster defined for NR-U frequency bands. For example, for a combination of each band for operating the NR-U system and the carrier/BWP bandwidth, if the maximum/minimum of the RB level offset value between the minimum RB index of the SS/PBCH block and the minimum RB index of CORESET #0 is in the range of [A, B], some or all of the values between A and B in the column corresponding to the offset of Table 10 may be signaled. For example, when A=−2 and B=5, 8 states among a total of 16 states correspond to one symbol, and the remaining 8 states correspond to two symbols. Each of the 8 states may signal an RB level offset value between −2 to 5. Additionally, the RE level offset value may be signaled by the value of $k_{SSB}$ in the same way as in the NR system.

Table 11 shows the configuration of CORESET #0 in the case of A=−2 and B=5.

TABLE 11

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 48 | 1 | −2 |
| 1 | 1 | 48 | 1 | −1 |
| 2 | 1 | 48 | 1 | 0 |
| 3 | 1 | 48 | 1 | 1 |
| 4 | 1 | 48 | 1 | 2 |
| 5 | 1 | 48 | 1 | 3 |
| 6 | 1 | 48 | 1 | 4 |
| 7 | 1 | 48 | 1 | 5 |
| 8 | 1 | 48 | 2 | −2 |
| 9 | 1 | 48 | 2 | −1 |
| 10 | 1 | 48 | 2 | 0 |
| 11 | 1 | 48 | 2 | 1 |
| 12 | 1 | 48 | 2 | 2 |
| 13 | 1 | 48 | 2 | 3 |
| 14 | 1 | 48 | 2 | 4 |
| 15 | 1 | 48 | 2 | 5 |

Figure 13:
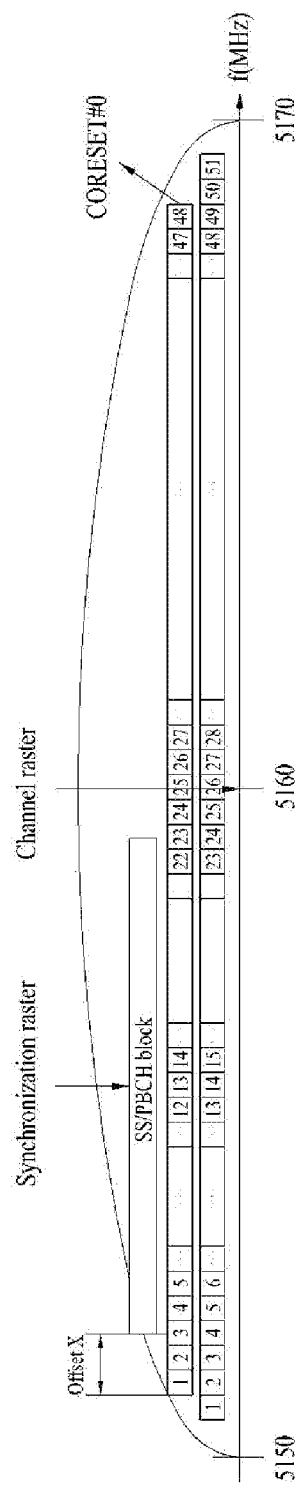

As an example, as shown in FIG. 13, when the UE receives an SS/PBCH block with a center frequency of 5155.68 MHz, which is the synchronization raster defined for a 5150 to 5170 MHz band, the UE may obtain 'offset X', which is a frequency offset between the SS/PBCH block and CORESET #0, from the PBCH payload of the corresponding SS/PBCH block. For example, when the UE is signaled with index #4 of Table 11 and $k_{SSB}$=6 through the PBCH payload, the UE may recognize that the frequency region of CORESET #0 starts from a position apart by 2 RBs and 6 REs from the SS/PBCH block.

Figure 14:
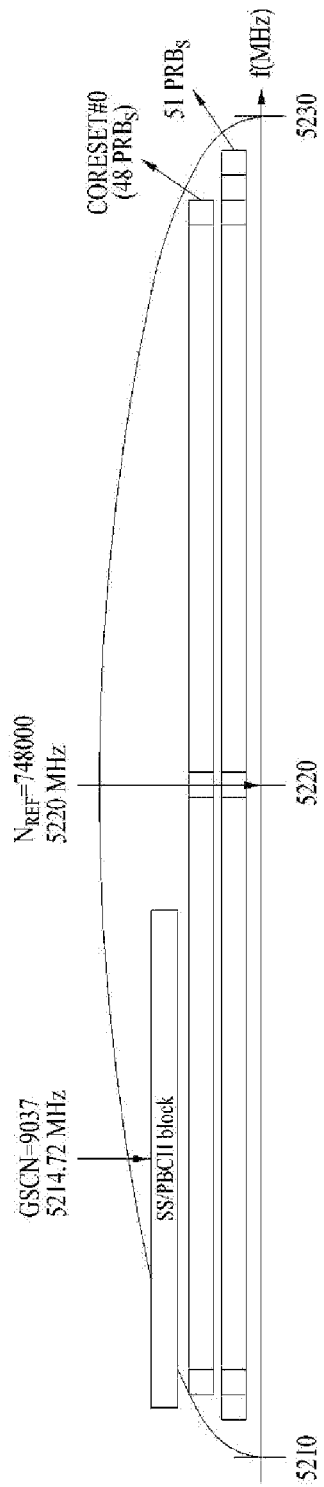
Figure 15:
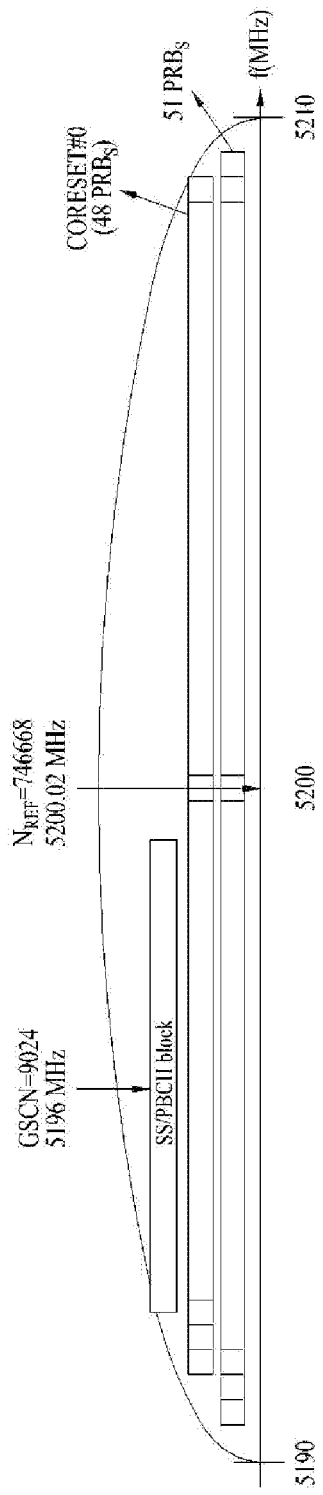

As another example, the frequency-domain position difference between RB #0 of the SS/PBCH block and RB #0 of 51 PRBs may be within 1 PRB as shown in FIG. 14, and the frequency-domain position difference between RB #0 of the SS/PBCH block and RB #0 of 51 PRBs may be more than 4 PRBs as shown in FIG. 15. For FIG. 14, it may be preferable that the first PRB of CORESET #0 is aligned with the second PRB among the 51 PRBs in consideration of interference with adjacent 20 MHz bands. In this case, −1 PRB may be required as the RB offset. Similarly, for FIG. 15, it may be preferable that the last PRB of CORESET #0 is aligned with the second last PRB among the 51 PRBs in consideration of interference with adjacent 20 MHz bands. In this case, 2 PRBs may be required as the RB offset. To this end, information about RB offset values from a minimum of −1 PRB to a maximum of 2 PRBs needs to be configured. The locations of the time/frequency-domain resources of CORESET #0 may be configured by the PBCH payload according to a method shown in Table 12 below. In Table 12, "reserved" states are to prepare for when an RB offset value that is not in the range of [−1, 2] is required. Alternatively, RB offsets in the range of [−k, k] (e.g., k=2) and reserved states may be signaled.

In addition, when the SS/PBCH block is transmitted based on the 15 kHz SCS, the number of RBs (or PRBs) may be set to 96, and the RB offset may be set to values corresponding to twice the RB offset values based on the 30 kHz SCS (in Table 12) as shown in Table 13. Alternatively, as shown in Table 14, the number of RBs (or PRBs) may be set to 96, and the RB offset may be determined by an RB granularity based on the 15 kHz SCS in addition to values corresponding to twice the RB offset values based on the 30 kHz SCS (in Table 12). Alternatively, as shown in Table 15, the RB offset may be determined by values reflecting differences between absolute frequency-domain resources corresponding to 20 PRBs of the SS/PBCH block in addition to values corresponding to twice the RB offset values based on the 30 kHz SCS (in Table 12). That is, since the SS/PBCH block consists of 20 PRBs regardless of SCSs, when the SCS is 15 kHz, frequency-domain resources may decrease (by 20 PRBs) compared to when the SCS is 30 kHz. Therefore, the RB offset values may be filled with values corresponding to {double of RB offset values based on 30 kHz SCS}+10 (because 10 PRBs are reduced with respect to the center frequency of the SS/PBCH block) (or with RB granularity values between the minimum/maximum values of the corresponding values) as shown in Table 15.

Table 12 shows the configuration of CORESET #0 when the SS/PBCH block is based on the 30 kHz SCS, and Tables 13 to 15 show the configurations of CORESET #0 when the SS/PBCH block is based on the 15 kHz SCS. In the tables, a to d denote integers, respectively. The RB offset is defined based on the SCS of a CORESET (i.e., CORESET #0) for a Type0-PDCCH CSS set. As shown in FIGS. 12 to 15, the SCS of CORESET #0 is the same as the SCS of the corresponding SS/PBCH block.

TABLE 12

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 48 | 1 | −1 (=a) |
| 1 | 1 | 48 | 1 | 0 (=b) |
| 2 | 1 | 48 | 1 | 1 (=c) |
| 3 | 1 | 48 | 1 | 2 (=d) |
| 4 | 1 | 48 | 1 | Reserved |
| 5 | 1 | 48 | 1 | Reserved |
| 6 | 1 | 48 | 1 | Reserved |
| 7 | 1 | 48 | 1 | Reserved |
| 8 | 1 | 48 | 2 | −1 (=a) |
| 9 | 1 | 48 | 2 | 0 (=b) |
| 10 | 1 | 48 | 2 | 1 (=c) |
| 11 | 1 | 48 | 2 | 2 (=d) |
| 12 | 1 | 48 | 2 | Reserved |
| 13 | 1 | 48 | 2 | Reserved |
| 14 | 1 | 48 | 2 | Reserved |
| 15 | 1 | 48 | 2 | Reserved |

TABLE 13

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 96 | 1 | −2 (=2a) |
| 1 | 1 | 96 | 1 | 0 (=2b) |
| 2 | 1 | 96 | 1 | 2 (=2c) |
| 3 | 1 | 96 | 1 | 4 (=2d) |
| 4 | 1 | 96 | 1 | Reserved |
| 5 | 1 | 96 | 1 | Reserved |
| 6 | 1 | 96 | 1 | Reserved |
| 7 | 1 | 96 | 1 | Reserved |
| 8 | 1 | 96 | 2 | −2 (=2a) |
| 9 | 1 | 96 | 2 | 0 (=2b) |
| 10 | 1 | 96 | 2 | 2 (=2c) |
| 11 | 1 | 96 | 2 | 4 (=2d) |
| 12 | 1 | 96 | 2 | Reserved |
| 13 | 1 | 96 | 2 | Reserved |
| 14 | 1 | 96 | 2 | Reserved |
| 15 | 1 | 96 | 2 | Reserved |

TABLE 14

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 96 | 1 | −2 (=2a) |
| 1 | 1 | 96 | 1 | −1 |
| 2 | 1 | 96 | 1 | 0 (=2b) |
| 3 | 1 | 96 | 1 | 1 |
| 4 | 1 | 96 | 1 | 2 (=2c) |
| 5 | 1 | 96 | 1 | 3 |
| 6 | 1 | 96 | 1 | 4 (=2d) |
| 7 | 1 | 96 | 1 | Reserved |
| 8 | 1 | 96 | 2 | −2 (=2a) |
| 9 | 1 | 96 | 2 | −1 |
| 10 | 1 | 96 | 2 | 0 (=2b) |
| 11 | 1 | 96 | 2 | 1 |
| 12 | 1 | 96 | 2 | 2 (=2c) |
| 13 | 1 | 96 | 2 | 3 |
| 14 | 1 | 96 | 2 | 4 (=2d) |
| 15 | 1 | 96 | 2 | Reserved |

TABLE 15

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 96 | 1 | 8 (=2a + 10) |
| 1 | 1 | 96 | 1 | 10 (=2b + 10) |
| 2 | 1 | 96 | 1 | 12 (=2c + 10) |
| 3 | 1 | 96 | 1 | 14 (=2d + 10) |
| 4 | 1 | 96 | 1 | Reserved |
| 5 | 1 | 96 | 1 | Reserved |
| 6 | 1 | 96 | 1 | Reserved |
| 7 | 1 | 96 | 1 | Reserved |
| 8 | 1 | 96 | 2 | 8 (=2a + 10) |
| 9 | 1 | 96 | 2 | 10 (=2b + 10) |
| 10 | 1 | 96 | 2 | 12 (=2c + 10) |
| 11 | 1 | 96 | 2 | 14 (=2d + 10) |
| 12 | 1 | 96 | 2 | Reserved |
| 13 | 1 | 96 | 2 | Reserved |
| 14 | 1 | 96 | 2 | Reserved |
| 15 | 1 | 96 | 2 | Reserved |

[Method #2] An offset value from the channel raster corresponding to a frequency band in which an SS/PBCH block is transmitted to a specific frequency resource (e.g., center frequency) of CORESET #0 may be configured by the PBCH payload of the corresponding SS/PBCH block. In this case, the offset value may be defined at the RB and/or RE level, and the RB level offset value may have a range (that varies depending on each frequency band) determined based on a channel raster defined for NR-U frequency bands.

If channel raster candidates vary depending on coexistence with Wi-Fi, the channel raster in this proposal may mean a channel raster when the coexistence with Wi-Fi is assumed. In addition, if channel raster candidates vary according to the carrier/BWP bandwidth, the channel raster in this proposal may mean a channel raster when a specific carrier bandwidth (e.g., 20 MHz) is assumed.

For example, for a combination of each band for NR-U operation and a specific carrier bandwidth (e.g., 20 MHz), if the maximum/minimum of the RB level offset value from the channel raster to the specific frequency resource (e.g., center frequency) of CORESET #0 is in the range of [A, B], some or all of the values between A and B in the column corresponding to the offset of Table 10 may be signaled. For example, when A=−3 and B=4, 8 states among a total of 16 states correspond to one symbol, and the remaining 8 states correspond to two symbols. Each of the 8 states may signal an RB level offset value between −3 to 4. In addition, the RE level offset value may be signaled by the value of $k_{SSB}$ in the same way as in the NR system.

Table 16 shows the configuration of CORESET #0 in the case of A=−3 and B=4.

TABLE 16

| Index | SS/PBCH block and CORESET multiplexing pattern | Number of RBs $N^{CORESET}_{RB}$ | Number of symbols $N^{CORESET}_{symb}$ | Offset (RBs) |
|---|---|---|---|---|
| 0 | 1 | 48 | 1 | −3 |
| 1 | 1 | 48 | 1 | −2 |
| 2 | 1 | 48 | 1 | −1 |
| 3 | 1 | 48 | 1 | 0 |
| 4 | 1 | 48 | 1 | 1 |
| 5 | 1 | 48 | 1 | 2 |
| 6 | 1 | 48 | 1 | 3 |
| 7 | 1 | 48 | 1 | 4 |
| 8 | 1 | 48 | 2 | −3 |
| 9 | 1 | 48 | 2 | −2 |
| 10 | 1 | 48 | 2 | −1 |
| 11 | 1 | 48 | 2 | 0 |
| 12 | 1 | 48 | 2 | 1 |
| 13 | 1 | 48 | 2 | 2 |
| 14 | 1 | 48 | 2 | 3 |
| 15 | 1 | 48 | 2 | 4 |

Figure 16:
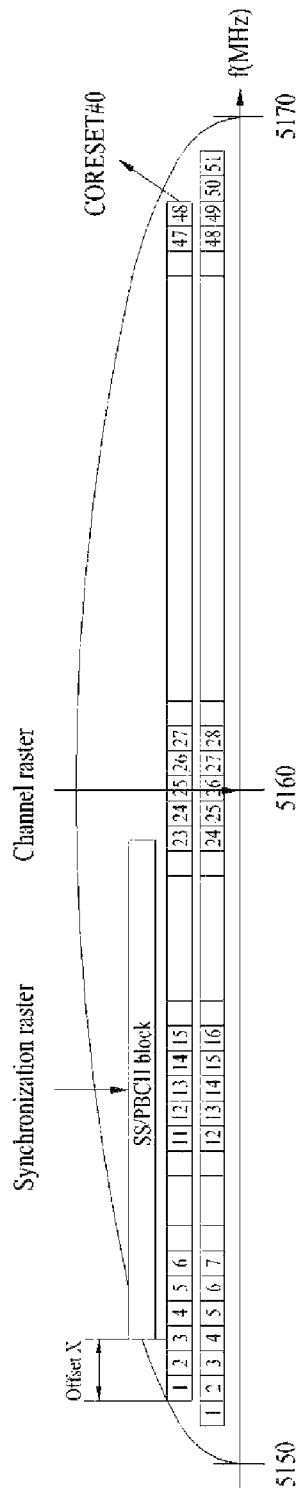

As an example, as shown in FIG. 16, when the UE receives an SS/PBCH block with a center frequency of 5155.68 MHz, which is the synchronization raster defined for a 5150 to 5170 MHz band, the UE may obtain an offset value between a specific channel raster value (e.g., 5160 MHz) defined in the corresponding band and the center frequency of CORESET #0 from the PBCH payload of the corresponding SS/PBCH block. For example, when the UE is signaled with index #3 of Table 16 and $k_{SSB}$=0 through the PBCH payload, the UE may identify the frequency resource region of CORESET #0 consisting of 48 PRBs with the channel raster as the center frequency. As another example, when the offset value from the channel raster corresponding to the frequency band in which the SS/PBCH block is transmitted to the specific frequency resource (e.g., center frequency) of CORESET #0 is configured by the PBCH payload of the SS/PBCH block, only the RE level offset value (except for the RB level offset) may be signaled as the corresponding offset value. That is, the center frequency of CORESET #0 may be aligned with the specific channel raster, and the RB grid of CORESET #0 may be aligned with the RB grid of the carrier/BWP, which is managed by the BS in the corresponding frequency band, by the $k_{SSB}$ value. In this case, the $k_{SSB}$ value may mean n RE offset(s) (in the lower frequency direction) with respect to the channel raster, which is the reference point (in this case, n may be a negative number) or mean n RE offset(s) (in the higher frequency direction) (in this case, n may be a positive number). For example, if the $k_{SSB}$ value is between 1 and 12, it may mean RE offset(s) in the higher frequency direction (for example, if $k_{SSB}$=n, it may mean n RE offset(s) in the higher frequency direction). If the $k_{SSB}$ value is between 13 and 23, it may mean RE offset(s) in the lower frequency direction (for example, if $k_{SSB}$=n, it may mean (n-12) RE offset(s) in the lower frequency direction).

[Method #3] Candidates may be defined for a plurality of CORESET #0 frequency resource regions corresponding to a band in which an SS/PBCH block is transmitted, and which one of the candidates is actually used may be configured by the PBCH payload of the corresponding SS/PBCH block. In this case, the plurality of candidates for CORESET #0 frequency resource regions may vary depending on the carrier/BWP bandwidth, the number of PRBs used in the carrier/BWP bandwidth, and/or the location of a 20 MHz band in which the SS/PBCH block is transmitted in the carrier/BWP bandwidth (for example, whether the SS/PBCH block is located at a higher 20 MHz band or a lower 20 MHz band of a 40 MHz carrier bandwidth). In addition, the RB grid as well as the location of CORESET #0 may be informed by signaling.

Figure 17:
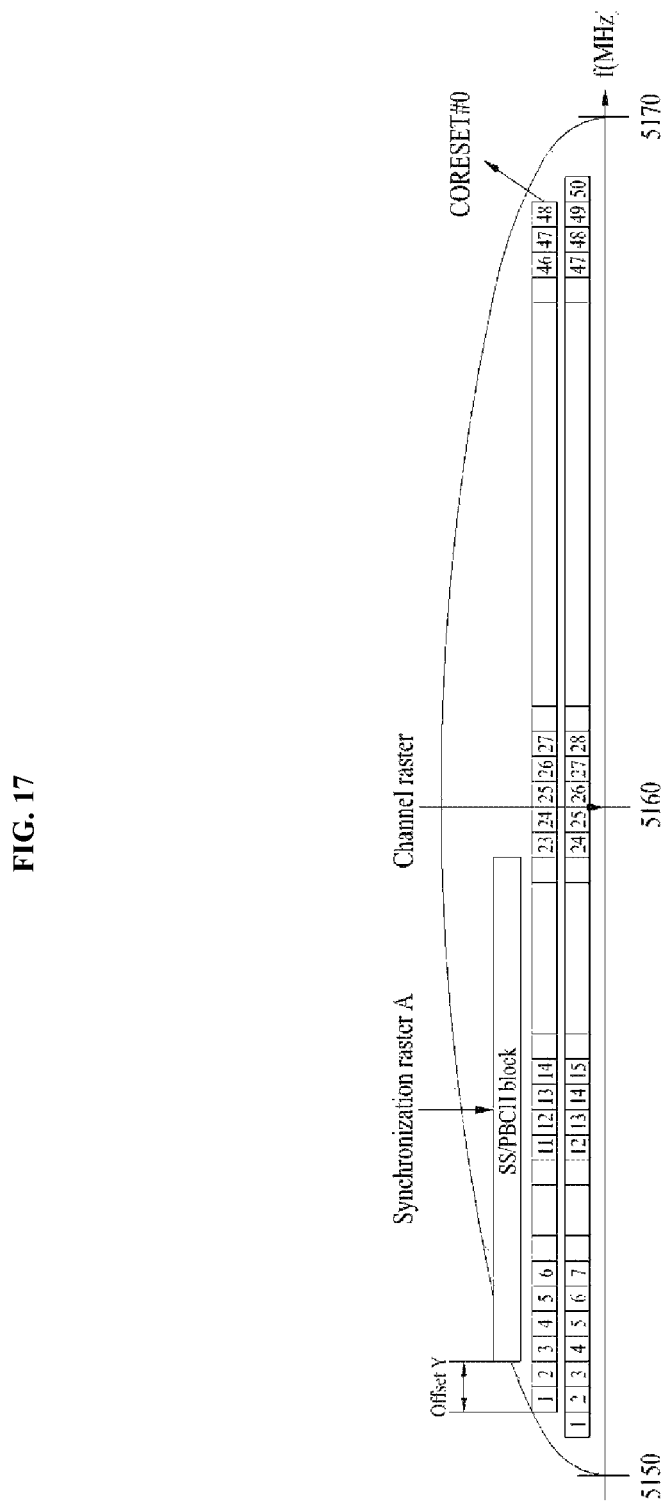
Figure 18:
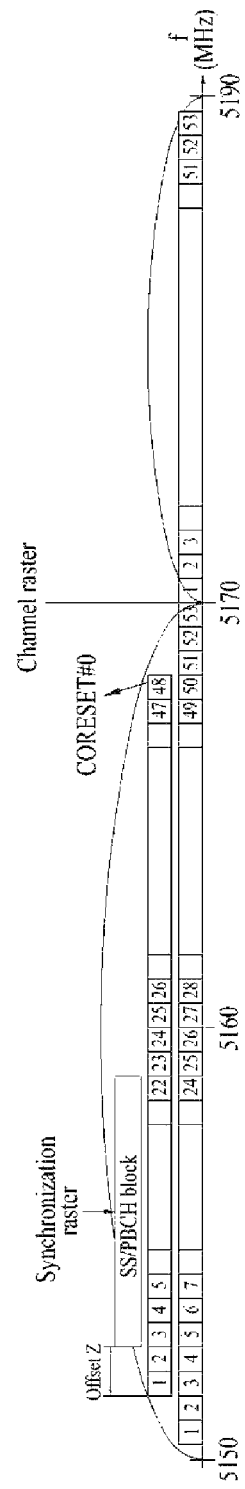

For convenience, when a 20 MHz carrier is configured with 51 PRBs in the 5150 to 5170 MHz band as shown in FIG. 16, the offset value between the SS/PBCH block and CORESET #0 may be defined as offset X. When a 20 MHz carrier is configured with 50 PRBs in the 5150 to 5170 MHz band as shown in FIG. 17, the offset value between the SS/PBCH block and CORESET #0 may be defined as offset Y. When a 40 MHz carrier is configured with 106 PRBs in the 5150 to 5190 MHz band as shown in FIG. 18, the offset value between the SS/PBCH block and CORESET #0 may be defined as offset Z.

The BS may inform one of offsets X/Y/Z through the PBCH payload. When the UE receives the SS/PBCH block with a center frequency of 5155.68 MHz, which is the synchronization raster defined in the 5150 to 5170 MHz band, the UE may obtain one of offsets X/Y/Z from the PBCH payload of the corresponding SS/PBCH block. The UE may identify the location of the minimum RB of CORESET #0 by applying the received offset. This example relates to signaling of the offset value between the SS/PBCH block and CORESET #0, but an offset value between the channel raster and a specific frequency resource (e.g., center frequency) of CORESET #0 may also be signaled as in [Method #2]. In addition, the corresponding offset value may be defined/interpreted differently according to the frequency band of the SS/PBCH block.

[Method #4] If the UE needs to decode the PBCH payload for an SS/PBCH block other than the synchronization raster to determine the locations of frequency resources of CORESET #0, the UE may reinterpret information in the decoded PBCH payload by assuming that the SS/PBCH block is transmitted in the synchronization raster defined for a band corresponding to the corresponding SS/PBCH block.

According to the following motivation, the BS may need to provide information on CORESET #0 frequency resources even for the SS/PBCH block other than the synchronization raster.

Different operators may coexist in an unlicensed band, and the same operator may be in unplanned deployment environments, so the same (physical) cell ID may be used between cells in the same band. To prevent the UE from being confused by this problem, the BS may need to transmit information about CORESET #0 and a type0-PDCCH CSS set for higher layer signaling (e.g., SIB1) containing information on an operator ID, a public land mobile network (PLMN) ID, or a global cell ID (even for an SS/PBCH block that is not transmitted in the synchronization raster). For example, assuming that gNB #X transmits an SS/PBCH block in frequency #X and UE #Y is associated with gNB #Y, gNB #Y may instruct UE #Y to perform measurement on frequency #X (frequency #X may not match the synchronization raster). After performing the measurement on frequency #X, UE #Y may report a discovered cell ID of gNB #X and the measurement result of a corresponding cell to gNB #Y. If gNB #Y does not know whether gNB #X is the same operator, gNB #Y may instruct UE #Y to read higher layer signaling (e.g., SIB1) containing information on the operator ID, PLMN ID or global cell ID of gNB #X and report the information on the operator ID, PLMN ID, or global cell ID. Upon receiving the corresponding information, gNB #Y may update the operator information on gNB #X. Considering this operation, gNB #X transmitting the SS/PBCH block in frequency #X may need to transmit information about CORESET #0 and a type0-PDCCH CSS set for scheduling a PDSCH carrying higher layer signaling containing information on an operator ID, a PLMN ID, or a global cell ID explicitly/implicitly in the SS/PBCH block (for convenience, although such higher layer signaling is named SIB1, it may correspond to cell-common higher layer signaling).

Figure 19:
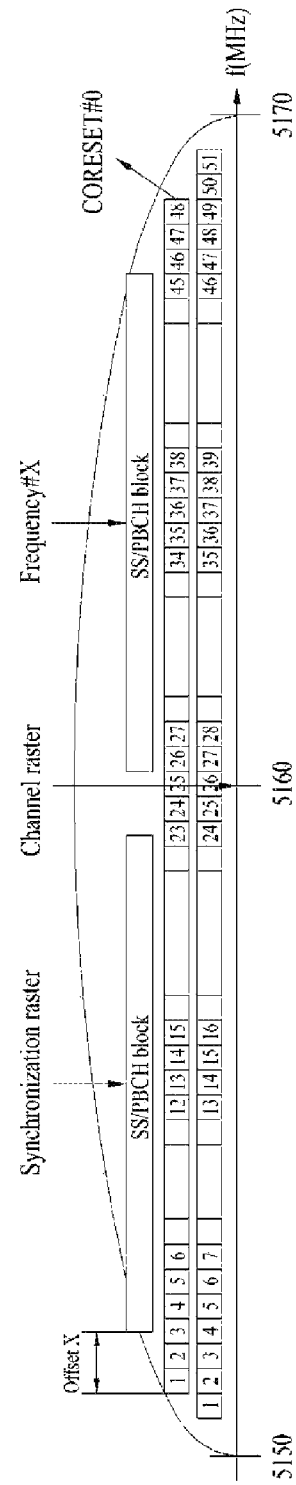

For example, as shown in FIG. 19, if the UE decodes the PBCH payload of an SS/PBCH block having, as the center frequency, frequency #X rather than the synchronization raster, the UE may interpret information in the decoded PBCH payload based on an SS/PBCH block having as the center frequency 5155.68 MHz, which is the synchronization raster defined for the 5150 to 5170 MHz band corresponding to the corresponding SS/PBCH block. Specifically, if the UE receives an RB/RE level offset value from the PBCH payload corresponding to frequency #X, the UE may interpret the corresponding value as an offset value from a specific RE of an SS/PBCH block on the synchronization raster (e.g., the first RE on the minimum RB index) to a specific RE of CORESET #0 (e.g., the first RE on the minimum RB index) in order to identify the locations of frequency resources of CORESET #0 as in [Method #1]. If the UE receives an RB/RE level offset value from the PBCH payload corresponding to frequency #X, the UE may interpret the corresponding value as an offset value from the channel raster of a band to which frequency #X belongs to a specific frequency resource (e.g., center frequency) of CORESET #0 in order to identify the locations of frequency resources of CORESET #0 as in [Method #2]. Alternatively, if the UE receives one of a plurality of candidates from the PBCH payload corresponding to frequency #X, the UE may interpret the corresponding value as an actual resource among the plurality of candidates for CORESET #0 frequency resource regions corresponding to the 5150 and 5170 MHz band to which frequency #X belongs in order to identify the locations of frequency resources of CORESET #0 as in [Method #3].

[Method #5] If the UE needs to decode the PBCH payload for an SS/PBCH block other than the synchronization raster to determine the locations of frequency resources of CORESET #0, there may be restrictions on center frequency resources where SS/PBCH block transmission is allowed, rather than the synchronization raster in consideration of the limited PBCH payload. The interval between center frequencies where the SS/PBCH block transmission is allowed may be a PRB or a multiple of PRBs, where the PRB may be based on the 30 kHz SCS (or 15 kHz SCS). In this case, the offset between the SS/PBCH block and CORESET #0 with an interval of one or multiple PRBs may need to be signaled. If the number of values required for the corresponding signaling is less than or equal to 8, it may be configured by the CORESET configuration in the MIB as shown in Table 11/12. If the number of values required for the corresponding signaling is more than 8, it may be configured by some or all of the bits for the CORESET configuration and/or $k_{SSB}$ value in the MIB.

[Method #6] If the UE needs to decode the PBCH payload for an SS/PBCH block other than the synchronization raster to determine the locations of frequency resources of CORESET #0, signaling of the value of $N^{QCL}_{SSB}$ may be different from signaling of the SS/PBCH block transmitted in the synchronization raster in order to support that the center frequency value of the SS/PBCH block is located without any restrictions on the 15 kHz SCS granularity.

The $N^{QCL}_{SSB}$ value indicates the QCL relationship between different candidate SSB indices. In the current NR-U, one of {1, 2, 4, 8} is indicated by the PBCH payload based on a combination of (1) 1 bit of subCarrierSpacingCommon and (2) 1 bit of spare or the LSB 1 bit of ssb-SubcarrierOffset (see Table 6). The value of ssb-SubcarrierOffset is used to indicate the $k_{SSB}$ value in FR1. In the current NR-U, since both the synchronization raster and the channel raster are located at the 30 kHz granularity, the LSB 1 bit of ssb-SubcarrierOffset indicated in units of 15 kHz is redundant. Therefore, the corresponding LSB 1 bit may be used to signal the $N^{QCL}_{SSB}$ value.

However, for an SS/PBCH block having as the center frequency a frequency resource other than the synchronization raster (e.g., SS/PBCH block for automatic neighbor relations (ANR)), transmission may be allowed at any 15 kHz granularity in the frequency domain. The ANR refers to a method for minimizing or eliminating manual work on neighbor information when installing a new BS and optimizing the neighbor information. When there is an SS/PBCH block for ANR in a cell, the UE may read the cell global identifier (CGI) of the cell from the SS/PBCH block and report the CGI to the BS. On the other hand, when there is an SS/PBCH block for non-ANR in the cell, the UE may only perform channel measurement for the corresponding cell based on the SS/PBCH block. Since the channel raster defined in the 5 GHz band for the NR-U system is located on the 30 kHz granularity, REs of CORESET #0 may also be located on the 30 kHz granularity. Accordingly, if an SS/PBCH block is transmitted with the 15 kHz granularity and CORESET #0 is transmitted with the 30 kHz granularity, the LSB 1 bit of ssb-SubcarrierOffset may also be required for signaling of $k_{SSB}$. In this case, since there is a problem that the $N^{QCL}_{SSB}$ value is not signaled by the LSB 1 bit of ssb-SubcarrierOffset, another method of signaling the $N^{QCL}_{SSB}$ value is proposed. That is, for an SS/PBCH block transmitted based on the synchronization raster, the $N^{QCL}_{SSB}$ value may be signaled in the same way as in Table 6, but for an SS/PBCH block having as the center frequency a frequency resource other than the synchronization raster, the $N^{QCL}_{SSB}$ value may be signaled according to Opt1 or Opt2.

Opt1: Instead of the LSB of ssb-SubcarrierOffset, the $N^{QCL}_{SSB}$ value may be signaled by combining subCarrierSpacingCommon with other bits in the PBCH payload.

Opt2: Signaling of the $N^{QCL}_{SSB}$ value may be configured only with 1 bit of subCarrierSpacingCommon.

Opt1 is a method of signaling the $N^{QCL}_{SSB}$ value as shown in Table 6 by combing 1 bit of the PBCH payload (e.g., MSB 1 bit of 4 bits of pdcch-ConfigSIB1, 1 bit of dmrs-TypeA-Position, etc.) with subCarrierSpacingCommon. The reason that the MSB 1 bit of the 4 bits of pdcch-ConfigSIB1 is available is that 8 reserved states may not be signaled as shown in Table 9. In addition, if the 1 bit of dmrs-TypeA-Position is used, the position of a type A DMRS needs to be assumed. When receiving a PDCCH/PDSCH for receiving SI corresponding to an SS/PBCH block having a frequency resource other than the synchronization raster as the center frequency, the UE may assume that the first type A DMRS is always transmitted in the third (or fourth) symbol in a slot.

According to Opt2, when it is difficult to use an additional 1 bit of the PBCH payload, the $N^{QCL}_{SSB}$ value may be signaled only by subCarrierSpacingCommon as shown in Table 17. Table 17 shows a merely example of signaling, and actual values corresponding to scs15or60 and scs30or120 may be replaced by any one of 1, 2, 4, and 8.

TABLE 17

| subCarrierSpacingCommon | $N^{QCL}_{SSB}$ |
| --- | --- |
| scs15or60 | 1 [or 2] |
| scs30or120 | 4 [or 8] |

[Method #7] When the PBCH payload indicates that the $N^{QCL}_{SSB}$ value is one of {1, 2, 4, 8} with a combination of 1 bit corresponding to subcarrierSpacingCommon and the LSB 1 bit of ssb-SubcarrierOffset (see Table 6), the LSB of $k_{SSB}$ may need to be defined. Specifically, the LSB of $k_{SSB}$ may be defined as 0 in the following cases: 1) when the center frequency of an SS/PBCH block is equal to the synchronization raster; 2) when the center frequency of the SS/PBCH block is equal to the channel raster; or 3) when the interval between the center frequency of the SS/PBCH block and the channel/synchronization raster is an integer multiple of 30 kHz. When the interval between the center frequency of the SS/PBCH block and the channel/synchronization raster is an integer multiple of 15 kHz (except for zero), the LSB of $k_{SSB}$ may be defined as '1'.

The interval of synchronization/channel rasters for the NR-U system in the 5 GHz band is all defined as an integer multiple of 30 kHz. Thus, if the carrier bandwidth is configured by considering the channel raster as the center frequency and if the SS/PBCH block and CORESET #0 are transmitted/configured in a part of the corresponding bandwidth (centered on the synchronization raster), the interval between the minimum RE (e.g., first subcarrier) of CORESET #0 and the minimum RE (e.g., first subcarrier) of the SS/PBCH block must be an integer multiple of 30 kHz. Specifically, the RE/RB level interval between the minimum RE of CORESET #0 and the minimum RE of the SS/PBCH block may be signaled by the PBCH payload. Here, the RE level interval may be expressed by 5 bits of $k_{SSB}$ (i.e., MSB 1 bit of 3 bits included in the MIB used for candidate SSB indices in FR2+4 bits of ssb-SubcarrierOffset). The RB level interval may be signaled based on CORESET configuration tables as described in [Method #1]. Specifically, a CRB grid may be generated by considering a point that is separated by the RE level interval corresponding to $k_{SSB}$ from the minimum RE of the SS/PBCH block as the reference point, and the location of the minimum RE of CORESET #0 may be determined by applying the RB level offset of the CORESET #0 configuration to the reference point (see FIG. 11). In this case, considering that $k_{SSB}$ corresponds to signaling at an interval of 15 kHz (that is, the number of subcarriers based on SCS=15 kHz) and in the NR-U system, the interval between the minimum RE of CORESET #0 and the minimum RE of the SS/PBCH block (centered on the synchronization raster) satisfies an integer multiple of 30 kHz, the LSB 1 bit of ssb-SubcarrierOffset may always be '0'. Accordingly, the corresponding value may be used for other purposes, for example, to signal the value of $N^{QCL}_{SSB}$.

However, as described in [Method #6], it may be necessary to find the location of CORESET #0 corresponding to SS/PBCH block that is not centered on the synchronization raster (for the purpose of ANR). In this case, (1) if the center frequency of the SS/PBCH block is the same as the channel raster or (2) if the interval between the center frequency of the SS/PBCH block and the channel/synchronization raster is an integer multiple of 30 kHz (e.g., 0, 30, 60, . . . ), the LSB of $k_{SSB}$ may also be defined as '0' (in the same way as when the SS/PBCH block transmitted in the synchronization raster) (for example, $k_{SSB}$=00000, 00010, 00100, . . . ; xxxx0, where x=0 or 1). On the other hand, if the interval between the center frequency of the SS/PBCH block not centered on the synchronization raster and the channel/synchronization raster is not an integer multiple of 30 kHz but an integer multiple of 15 kHz (except for zero) (e.g., 15, 45, . . . ), the LSB of $k_{SSB}$ may be defined as '1' (for example, k_SSB=00001, 00011, . . . ; xxxx1, where x=0 or 1). This is because the interval between each RE of CORESET #0 and the channel raster may be maintained as an integer multiple of 30 kHz to align the grid of CORESET #0 with the channel raster. Therefore, if the interval between the center frequency of the SS/PBCH block not centered on the synchronization raster and the channel/synchronization raster is not an integer multiple of 30 kHz but an integer multiple of 15 kHz (except for zero), an odd value of $k_{SSB}$ may be signaled (i.e., a value of LSB=1).

In other words, when the PBCH payload indicates that the $N^{QCL}_{SSB}$ value is one of {1, 2, 4, 8} with a combination of 1 bit corresponding to subcarrierSpacingCommon and the LSB 1 bit of ssb-SubcarrierOffset, If the interval between the center frequency of the SS/PBCH block and the channel/synchronization raster satisfy an integer multiple of 30 kHz (including zero), the LSB 1 bit of ssb-SubcarrierOffset (or $k_{SSB}$) may be assumed to be '0'.

On the other hand, if the interval between the center frequency of the SS/PBCH block and the channel/synchronization raster does not satisfy an integer multiple of 30 kHz (including zero) but satisfies an integer multiple of 15 kHz (except for zero), the LSB 1 bit of ssb-SubcarrierOffset (or $k_{SSB}$) may be assumed to be '1'.

The above proposals may be summarized as follows in conjunction with Table 6.

TABLE 18

| subCarrierSpacingCommon | LSB of ssb-SubcarrierOffset (actual value) | $N^{QCL}_{SSB}$ | LSB of ssb-SubcarrierOffset (assumed value for k_SSB) |
|---|---|---|---|
| scs15or60 | 0 | 1 | 0 for case A |
| scs15or60 | 1 | 2 | 1 for case B |
| scs30or120 | 0 | 4 | |
| scs30or120 | 1 | 8 | |

\* Case A: The interval between the center frequency of the SS/PBCH block and the channel/synchronization raster is an integer multiple of 30 kHz (including zero).
\* Case B: The interval between the center frequency of the SS/PBCH block and the channel/synchronization raster is not an integer multiple of 30 kHz (including zero).

Alternatively, $k_{SSB}$ may be defined as follows (see Table 19).

If the SS/PBCH block is detected on a licensed carrier:
k_SSB=MSB 1 bit of 3 bits included in MIB used for candidate SSB indices+4 bits of ssb-SubcarrierOffset.

If the SS/PBCH block is detected in an unlicensed carrier:
k_SSB=MSB 1 bit of 3 bits of MIB used for candidate SSB indices+MSB 3 bits of ssb-SubcarrierOffset+X (where X=0 for case A or X=1 for case B; see Table 9).

TABLE 19

| Carrier | LSB of k_SSB |
|---|---|
| Licensed carrier | LSB of ssb-SubcarrierOffset |
| Unlicensed carrier | 0 for case A (see, table 17)1 for case B (see, table 17) | location of CORESET #0 based on the value of $k_{SSB}$. Also, the UE may perform the operation of FIG. 9 based on the value of $N^{QCL}_{SSB}$.

Additionally, this method may be applied only when the MSB 2 bits of $k_{SSB}$ (that is, the MSB 1 bit of 3 bits of the MIB used for candidate SSB indices in FR2 and the MSB 1 bit of 4 bits of ssb-SubcarrierOffset) are not '11' in current Rel-15 NR. The reason for this is that in the Rel-15 NR system, when the value of $k_{SSB}$ is more than or equal to 24 (that is, when each of the MSB 2 bits of $k_{SSB}$ is '1'), the value of $k_{SSB}$ is used to inform the location of the nearest SS/PBCH block (including CORESET #0 information) because CORESET #0 is not provided in the corresponding SS/PBCH block as shown in Table 20. In other words, in the current Rel-15 NR system, if the MSB 2 bits of $k_{SSB}$ (that is, the MSB 1 bit of 3 bits of the MIB used for candidate SSB indices in FR2 and the MSB 1 bit of 4 bits of ssb-SubcarrierOffset) are '11' (even for unlicensed bands), the LSB of ssb-SubcarrierOffset may be set to the LSB of $k_{SSB}$ and then interpreted as in Table 20. On the other hand, if the MSB 2 bits of $k_{SSB}$ are '00', '10', or '01', the LSB of $k_{SSB}$ may be configured according to the present method. Alternatively, if the MSB 2 bits of $k_{SSB}$ are '11' (even for unlicensed band), the LSB of ssb-SubcarrierOffset may be set to the LSB of $k_{SSB}$ as in the current Rel-15 NR system. If the MSB 2 bits of $k_{SSB}$ are '00', '10' or '01', the LSB of $k_{SSB}$ may be always set to '0'. The location of the SS/PBCH block not centered on the synchronization raster (where the location of CORESET #0 needs to be found for the purpose of ANR) may be restricted so that the location is only a multiple of 30 kHz from the synchronization raster.

TABLE 20

3GPP TS 38.213 Rel-15, Section 13
If a UE detects a first SS/PBCH block and determines that a CORESET for Type0-PDCCH CSS set is not present, and for 24≤$k_{SSB}$≤29 for FR1 or for 12≤$k_{SSB}$≤13 for FR2, the UE may determine the nearest (in the corresponding frequency direction) global synchronization channel number (GSCN) of a second SS/PBCH block having a CORESET for an associated Type0-PDCCH CSS set as $N^{Reference}_{GSCN}$ + $N^{Offset}_{GSCN}$. $N^{Reference}_{GSCN}$ is the GSCN of the first SS/PBCH block and $N^{Offset}_{GSCN}$ is a GSCN offset provided by a combination of $k_{SSB}$ and controlResourceSetZero and searchSpaceZero in pdcch-ConfigSIB1. If the UE detects the second SS/PBCH block and the second SS/PBCH block does not provide a CORESET for Type0-PDCCH CSS set, the UE may ignore the information related to GSCN of SS/PBCH block locations for performing cell search.
If a UE detects a SS/PBCH block and determines that a CORESET for Type0-PDCCH CSS set is not present, and for $k_{SSB}$=31 for FR1 or for $k_{SSB}$=15 for FR2, the UE determines that there is no SS/PBCH block having an associated Type0-PDCCH CSS set within a GSCN range [$N^{Reference}_{GSCN}$ − $N^{Start}_{GSCN}$, $N^{Reference}_{GSCN}$ + $N^{End}_{GSCN}$]. $N^{Start}_{GSCN}$ and $N^{End}_{GSCN}$ are respectively determined by controlResourceSetZero and searchSpaceZero in pdcch-ConfigSIB1. If the GSCN range is [$N^{Reference}_{GSCN}$, $N^{Reference}_{GSCN}$], the UE determines that there is no information for a second SS/PBCH block with a CORESET for an associated Type0-PDCCH CSS set on the detected SS/PBCH block.
If a UE does not detect any SS/PBCH block providing a CORESET for Type0-PDCCH CSS set, within a time period determined by the UE, the UE may ignore the information related to GSCN of SS/PBCH locations in performing cell search.

Figure 20:
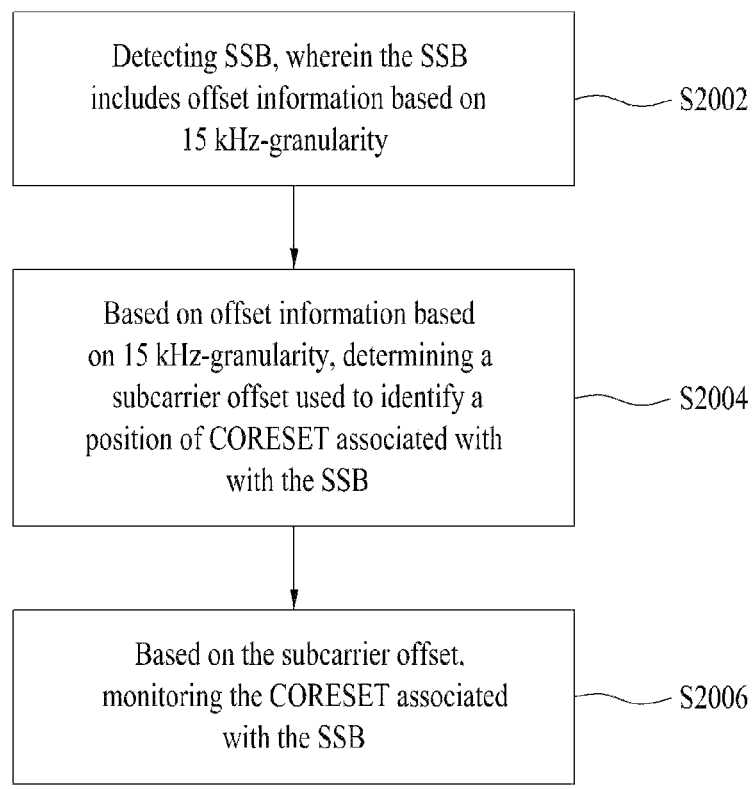
FIGS. 20 to 22 illustrate signal transmission and reception according to proposals of the present disclosure.

Licensed and unlicensed carriers may be identified according to the frequency of the carrier in which the SS/PBCH block is detected, and the interval with the channel/synchronization raster may be predefined for each carrier (type) in specifications. Alternatively, even when the same frequency is used, the carrier type (licensed or unlicensed carrier) may vary depending on regions. In this case, the licensed and unlicensed carriers may be identified by different PBCH payloads or CRC values. To identify the carrier type at the corresponding frequency, a synchronization raster for the licensed band and a synchronization raster for the unlicensed band may be separately defined in specifications. The UE may perform PDCCH monitoring by finding the FIG. 20 illustrates a signal transmission process according to an example of the present disclosure. Referring to FIG. 20, a UE may detect an SSB in a cell (S2002). In this case, the SSB may include 15 kHz-granularity-based offset information. The UE may determine a subcarrier offset used to identify a frequency position of a CORESET associated with the SSB based on the 15 kHz-granularity-based offset information (S2204). Thereafter, the UE may monitor the CORESET associated with the SSB based on the subcarrier offset (S2206). In this case, based on detection of the SSB in an unlicensed band, (1) a difference between a synchronization raster in the unlicensed band and the center frequency of the SSB may be limited to a multiple of 30 kHz, and/or (2) the subcarrier offset may indicate only a multiple of 30 kHz based on the 15 kHz-granularity-based offset information.

In this case, based on the detection of the SSB in the unlicensed band, the subcarrier offset may indicate a multiple of 15 kHz. The 15 kHz-granularity-based offset information may include 4 bits of ssb-SubcarrierOffset as least significant bits (LSBs). In addition, based on the detection of the SSB in the unlicensed band, the subcarrier offset may be determined to be equal to a value obtained by setting one LSB of the 15 kHz-granularity-based offset information to '0'. Further, based on the detection of the SSB in the unlicensed band, the one LSB of the 15 kHz-granularity-based offset information may be used to identify SSB candidates in a quasi-co-location (QCL) relationship.

2) Transmitter (Entity B) (e.g., BS)

[Method #1A] The BS may signal an offset value from a specific RE of an SS/PBCH block (e.g., the first RE in the minimum RB index) to a specific RE of CORESET #0 (e.g., the first RE in the minimum RB index) through the PBCH payload of the corresponding SS/PBCH block. In this case, the offset value may be defined at the RB and/or RE level, and the RB level offset value may have a range (that varies depending on each frequency band) determined based on the synchronization raster and channel raster defined for NR-U frequency bands. Here, the RE refers to a unit on the frequency axis, and the order of REs may be equivalent to the order of REs in one OFDM symbol. Accordingly, an RE may be replaced with a subcarrier.

When the UE attempts initial access in frequency bands of the NR-U system, the UE may expect an SS/PBCH and CORESET #0 with an SCS of 30 kHz. In this case, the frequency-domain position and time-domain duration of CORESET #0 may be defined the same as those of the current NR system. Table 10 shows sets of RBs and slot symbols of CORESET for a Type0-PDCCH search space set when the SCS of {SS/PBCH block, PDCCH} is {30, 30} kHz for frequency bands with a minimum channel bandwidth of 5 or 10 MHz in the current NR system.

However, the following restrictions may be imposed in NR-U: the number of RBs of 30 kHz CORESET #0 is 48, and the time-domain duration thereof is one or two (OFDM) symbols. In addition, the range of the RB level offset value may be determined by the synchronization raster and channel raster defined for NR-U frequency bands. For example, for a combination of each band for operating the NR-U system and the carrier/BWP bandwidth, if the maximum/minimum of the RB level offset value between the minimum RB index of the SS/PBCH block and the minimum RB index of CORESET #0 is in the range of [A, B], some or all of the values between A and B in the column corresponding to the offset of Table 10 may be signaled. For example, when A=−2 and B=5, 8 states among a total of 16 states correspond to one symbol, and the remaining 8 states correspond to two symbols. Each of the 8 states may signal an RB level offset value between −2 to 5. Additionally, the RE level offset value may be signaled by the value of $k_{SSB}$ in the same way as in the NR system. Table 11 shows the configuration of CORESET #0 in the case of A=−2 and B=5.

As an example, as shown in FIG. 13, when the UE receives an SS/PBCH block with a center frequency of 5155.68 MHz, which is the synchronization raster defined for a 5150 to 5170 MHz band, the UE may obtain 'offset X', which is a frequency offset between the SS/PBCH block and CORESET #0, from the PBCH payload of the corresponding SS/PBCH block. For example, when the UE is signaled with index #4 of Table 11 and $k_{SSB}$=6 through the PBCH payload, the UE may recognize that the frequency region of CORESET #0 starts from a position apart by 2 RBs and 6 REs from the SS/PBCH block.

As another example, the frequency-domain position difference between RB #0 of the SS/PBCH block and RB #0 of 51 PRBs may be within 1 PRB as shown in FIG. 14, and the frequency-domain position difference between RB #0 of the SS/PBCH block and RB #0 of 51 PRBs may be more than 4 PRBs as shown in FIG. 15. For FIG. 14, it may be preferable that the first PRB of CORESET #0 is aligned with the second PRB among the 51 PRBs in consideration of interference with adjacent 20 MHz bands. In this case, −1 PRB may be required as the RB offset. Similarly, for FIG. 15, it may be preferable that the last PRB of CORESET #0 is aligned with the second last PRB among the 51 PRBs in consideration of interference with adjacent 20 MHz bands. In this case, 2 PRBs may be required as the RB offset. To this end, information about RB offset values from a minimum of −1 PRB to a maximum of 2 PRBs needs to be configured. The locations of the time/frequency-domain resources of CORESET #0 may be configured by the PBCH payload according to a method shown in Table 12 above. In Table 12, "reserved" states are to prepare for when an RB offset value that is not in the range of [−1, 2] is required. Alternatively, RB offsets in the range of [−k, k] (e.g., k=2) and reserved states may be signaled.

In addition, when the SS/PBCH block is transmitted based on the 15 kHz SCS, the number of RBs (or PRBs) may be set to 96, and the RB offset may be set to values corresponding to twice the RB offset values based on the 30 kHz SCS (in Table 12) as shown in Table 13. Alternatively, as shown in Table 14, the number of RBs (or PRBs) may be set to 96, and the RB offset may be determined by an RB granularity based on the 15 kHz SCS in addition to values corresponding to twice the RB offset values based on the 30 kHz SCS (in Table 12). Alternatively, as shown in Table 15, the RB offset may be determined by values reflecting differences between absolute frequency-domain resources corresponding to 20 PRBs of the SS/PBCH block in addition to values corresponding to twice the RB offset values based on the 30 kHz SCS (in Table 12). That is, since the SS/PBCH block consists of 20 PRBs regardless of SCSs, when the SCS is 15 kHz, frequency-domain resources may decrease (by 20 PRBs) compared to when the SCS is 30 kHz. Therefore, the RB offset values may be filled with values corresponding to {double of RB offset values based on 30 kHz SCS}+10 (because 10 PRBs are reduced with respect to the center frequency of the SS/PBCH block) (or with RB granularity values between the minimum/maximum values of the corresponding values) as shown in Table 15.

Table 12 shows the configuration of CORESET #0 when the SS/PBCH block is based on the 30 kHz SCS, and Tables 13 to 15 show the configurations of CORESET #0 when the SS/PBCH block is based on the 15 kHz SCS. In the tables, a to d denote integers, respectively. The RB offset is defined based on the SCS of a CORESET (i.e., CORESET #0) for a Type0-PDCCH CSS set. As shown in FIGS. 12 to 15, the SCS of CORESET #0 is the same as the SCS of the corresponding SS/PBCH block.

[Method #2A] An offset value from the channel raster corresponding to a frequency band in which an SS/PBCH block is transmitted to a specific frequency resource (e.g., center frequency) of CORESET #0 may be configured by the PBCH payload of the corresponding SS/PBCH block. In this case, the offset value may be defined at the RB and/or RE level, and the RB level offset value may have a range (that varies depending on each frequency band) determined based on the channel raster defined for NR-U frequency bands.

If channel raster candidates vary depending on coexistence with Wi-Fi, the channel raster in this proposal may mean a channel raster when the coexistence with Wi-Fi is assumed. In addition, if channel raster candidates vary according to the carrier/BWP bandwidth, the channel raster in this proposal may mean a channel raster when a specific carrier bandwidth (e.g., 20 MHz) is assumed.

For example, for a combination of each band for NR-U operation and a specific carrier bandwidth (e.g., 20 MHz), if the maximum/minimum of the RB level offset value from the channel raster to the specific frequency resource (e.g., center frequency) of CORESET #0 is in the range of [A, B], some or all of the values between A and B in the column corresponding to the offset of Table 10 may be signaled. For example, when A=−3 and B=4, 8 states among a total of 16 states correspond to one symbol, and the remaining 8 states correspond to two symbols. Each of the 8 states may signal an RB level offset value between −3 to 4. In addition, the RE level offset value may be signaled by the value of $k_{SSB}$ in the same way as in the NR system. Table 16 shows the configuration of CORESET #0 in the case of A=−3 and B=4.

As an example, as shown in FIG. 16, when the UE receives an SS/PBCH block with a center frequency of 5155.68 MHz, which is the synchronization raster defined for a 5150 to 5170 MHz band, the UE may obtain an offset value between a specific channel raster value (e.g., 5160 MHz) defined in the corresponding band and the center frequency of CORESET #0 from the PBCH payload of the corresponding SS/PBCH block. For example, when the UE is signaled with index #3 of Table 16 and $k_{SSB}$=0 through the PBCH payload, the UE may identify the frequency resource region of CORESET #0 consisting of 48 PRBs with the channel raster as the center frequency.

As another example, when the offset value from the channel raster corresponding to the frequency band in which the SS/PBCH block is transmitted to the specific frequency resource (e.g., center frequency) of CORESET #0 is configured by the PBCH payload of the SS/PBCH block, only the RE level offset value (except for the RB level offset) may be signaled as the corresponding offset value. That is, the center frequency of CORESET #0 may be aligned with the specific channel raster, and the RB grid of CORESET #0 may be aligned with the RB grid of the carrier/BWP, which is managed by the BS in the corresponding frequency band, by the $k_{SSB}$ value. In this case, the $k_{SSB}$ value may mean n RE offset(s) (in the lower frequency direction) with respect to the channel raster, which is the reference point (in this case, n may be a negative number) or mean n RE offset(s) (in the higher frequency direction) (in this case, n may be a positive number). For example, if the $k_{SSB}$ value is between 1 and 12, it may mean RE offset(s) in the higher frequency direction (for example, if $k_{SSB}$=n, it may mean n RE offset(s) in the higher frequency direction). If the $k_{SSB}$ value is between 13 and 23, it may mean RE offset(s) in the lower frequency direction (for example, if $k_{SSB}$=n, it may mean (n-12) RE offset(s) in the lower frequency direction).

[Method #3A] Candidates may be defined for a plurality of CORESET #0 frequency resource regions corresponding to a band in which an SS/PBCH block is transmitted, and which one of the candidates is actually used may be configured by the PBCH payload of the corresponding SS/PBCH block. In this case, the plurality of candidates for CORESET #0 frequency resource regions may vary depending on the carrier/BWP bandwidth, the number of PRBs used in the carrier/BWP bandwidth, and/or the location of a 20 MHz band in which the SS/PBCH block is transmitted in the carrier/BWP bandwidth (for example, whether the SS/PBCH block is located at a higher 20 MHz band or a lower 20 MHz band of a 40 MHz carrier bandwidth). In addition, the RB grid as well as the location of CORESET #0 may be informed by signaling.

For convenience, when a 20 MHz carrier is configured with 51 PRBs in the 5150 to 5170 MHz band as shown in FIG. 16, the offset value between the SS/PBCH block and CORESET #0 may be defined as offset X. When a 20 MHz carrier is configured with 50 PRBs in the 5150 to 5170 MHz band as shown in FIG. 17, the offset value between the SS/PBCH block and CORESET #0 may be defined as offset Y. When a 40 MHz carrier is configured with 106 PRBs in the 5150 to 5190 MHz band as shown in FIG. 18, the offset value between the SS/PBCH block and CORESET #0 may be defined as offset Z.

The BS may inform one of offsets X/Y/Z through the PBCH payload. When the UE receives the SS/PBCH block with a center frequency of 5155.68 MHz, which is the synchronization raster defined in the 5150 to 5170 MHz band, the UE may obtain one of offsets X/Y/Z from the PBCH payload of the corresponding SS/PBCH block. The UE may identify the location of the minimum RB of CORESET #0 by applying the received offset. This example relates to signaling of the offset value between the SS/PBCH block and CORESET #0, but an offset value between the channel raster and a specific frequency resource (e.g., center frequency) of CORESET #0 may also be signaled as in [Method #2A]. In addition, the corresponding offset value may be defined/interpreted differently according to the frequency band of the SS/PBCH block.

[Method #4A] If the UE needs to decode the PBCH payload for an SS/PBCH block other than the synchronization raster to determine the locations of frequency resources of CORESET #0, the UE may reinterpret information in the decoded PBCH payload by assuming that the SS/PBCH block is transmitted in the synchronization raster defined for a band corresponding to the corresponding SS/PBCH block.

According to the following motivation, the BS may need to provide information on CORESET #0 frequency resources even for the SS/PBCH block other than the synchronization raster.

Different operators may coexist in an unlicensed band, and the same operator may be in unplanned deployment environments, so the same (physical) cell ID may be used between cells in the same band. To prevent the UE from being confused by this problem, the BS may need to transmit information about CORESET #0 and a type0-PDCCH CSS set for higher layer signaling (e.g., SIB1) containing information on an operator ID, a PLMN ID, or a global cell ID (even for an SS/PBCH block that is not transmitted in the synchronization raster). For example, assuming that gNB #X transmits an SS/PBCH block in frequency #X and UE #Y is associated with gNB #Y, gNB #Y may instruct UE #Y to perform measurement on frequency #X (frequency #X may not match the synchronization raster). After performing the measurement on frequency #X, UE #Y may report a discovered cell ID of gNB #X and the measurement result of a corresponding cell to gNB #Y. If gNB #Y does not know whether gNB #X is the same operator, gNB #Y may instruct UE #Y to read higher layer signaling (e.g., SIB1) containing information on the operator ID, PLMN ID or global cell ID of gNB #X and report the information on the operator ID, PLMN ID, or global cell ID. Upon receiving the corresponding information, gNB #Y may update the operator information on gNB #X. Considering this operation, gNB #X transmitting the SS/PBCH block in frequency #X may need to transmit information about CORESET #0 and a type0-PDCCH CSS set for scheduling a PDSCH carrying higher layer signaling containing information on an operator ID, a PLMN ID, or a global cell ID explicitly/implicitly in the SS/PBCH block (for convenience, although such higher layer signaling is named SIB1, it may correspond to cell-common higher layer signaling).

For example, as shown in FIG. 19, if the UE decodes the PBCH payload of an SS/PBCH block having, as the center frequency, frequency #X rather than the synchronization raster, the BS may configure and transmit the corresponding PBCH payload based on an SS/PBCH block having as the center frequency 5155.68 MHz, which is the synchronization raster defined for the 5150 to 5170 MHz band corresponding to the corresponding SS/PBCH block. Specifically, if the UE receives an RB/RE level offset value from the PBCH payload corresponding to frequency #X, the UE may interpret the corresponding value as an offset value from a specific RE of an SS/PBCH block on the synchronization raster (e.g., the first RE on the minimum RB index) to a specific RE of CORESET #0 (e.g., the first RE on the minimum RB index) in order to identify the locations of frequency resources of CORESET #0 as in [Method #1A]. If the UE receives an RB/RE level offset value from the PBCH payload corresponding to frequency #X, the UE may interpret the corresponding value as an offset value from the channel raster of a band to which frequency #X belongs to a specific frequency resource (e.g., center frequency) of CORESET #0 in order to identify the locations of frequency resources of CORESET #0 as in [Method #2A]. Alternatively, if the UE receives one of a plurality of candidates from the PBCH payload corresponding to frequency #X, the UE may interpret the corresponding value as an actual resource among the plurality of candidates for CORESET #0 frequency resource regions corresponding to the 5150 and 5170 MHz band to which frequency #X belongs in order to identify the locations of frequency resources of CORESET #0 as in [Method #3A].

[Method #5A] If the UE needs to decode the PBCH payload for an SS/PBCH block other than the synchronization raster to determine the locations of frequency resources of CORESET #0, there may be restrictions on center frequency resources where SS/PBCH block transmission is allowed, rather than the synchronization raster in consideration of the limited PBCH payload. The interval between center frequencies where the SS/PBCH block transmission is allowed may be a PRB or a multiple of PRBs, where the PRB may be based on the 30 kHz SCS (or 15 kHz SCS). In this case, the offset between the SS/PBCH block and CORESET #0 with an interval of one or multiple PRBs may need to be signaled. If the number of values required for the corresponding signaling is less than or equal to 8, it may be configured by the CORESET configuration in the MIB as shown in Table 11/12. If the number of values required for the corresponding signaling is more than 8, it may be configured by some or all of the bits for the CORESET configuration and/or $k_{SSB}$ value in the MIB.

[Method #6A] If the UE needs to decode the PBCH payload for an SS/PBCH block other than the synchronization raster to determine the locations of frequency resources of CORESET #0, signaling of the value of $N^{QCL}_{SSB}$ may be different from signaling of the SS/PBCH block transmitted in the synchronization raster in order to support that the center frequency value of the SS/PBCH block is located without any restrictions on the 15 kHz SCS granularity.

The $N^{QCL}_{SSB}$ value indicates the QCL relationship between different candidate SSB indices. In the current NR-U, one of {1, 2, 4, 8} is indicated by the PBCH payload based on a combination of (1) 1 bit of subCarrierSpacing-Common and (2) 1 bit of spare or LSB 1 bit of ssb-SubcarrierOffset (see Table 6). The value of ssb-SubcarrierOffset is used to indicate the $k_{SSB}$ value in FR1. In the current NR-U, since both the synchronization raster and the channel raster are located at the 30 kHz granularity, the LSB 1 bit of ssb-SubcarrierOffset indicated in units of 15 kHz is redundant. Therefore, the corresponding LSB 1 bit may be used to signal the $N^{QCL}_{SSB}$ value.

However, for an SS/PBCH block having as the center frequency a frequency resource other than the synchronization raster (e.g., SS/PBCH block for ANR), transmission may be allowed at any 15 kHz granularity in the frequency domain. Since the channel raster defined in the 5 GHz band for the NR-U system is located on the 30 kHz granularity, REs of CORESET #0 may also be located on the 30 kHz granularity. Accordingly, if an SS/PBCH block is transmitted with the 15 kHz granularity and CORESET #0 is transmitted with the 30 kHz granularity, the LSB 1 bit of ssb-SubcarrierOffset may also be required for signaling of $k_{SSB}$. In this case, since there is a problem that the $N^{QCL}_{SSB}$ value is not signaled by the LSB 1 bit of ssb-SubcarrierOffset, another method of signaling the $N^{QCL}_{SSB}$ value is proposed. That is, for an SS/PBCH block transmitted based on the synchronization raster, the $N^{QCL}_{SSB}$ value may be signaled in the same way as in Table 6, but for an SS/PBCH block having as the center frequency a frequency resource other than the synchronization raster, the $N^{QCL}_{SSB}$ value may be signaled according to Opt1 or Opt2.

Opt1: Instead of the LSB of ssb-SubcarrierOffset, the $N^{QCL}_{SSB}$ value may be signaled by combining subCarrierSpacingCommon with other bits in the PBCH payload.

Opt2: Signaling of the $N^{QCL}_{SSB}$ value may be configured only with 1 bit of subCarrierSpacingCommon.

Opt1 is a method of signaling the $N^{QCL}_{SSB}$ value as shown in Table 6 by combing 1 bit of the PBCH payload (e.g., MSB 1 bit of 4 bits of pdcch-ConfigSIB1, 1 bit of dmrs-TypeA-Position, etc.) with subCarrierSpacingCommon. The reason the MSB 1 bit of the 4 bits of pdcch-ConfigSIB1 is available is that 8 reserved states may not be signaled as shown in Table 9. In addition, if the 1 bit of dmrs-TypeA-Position is used, the position of a type A DMRS needs to be assumed. If the UE receives a PDCCH/PDSCH for receiving SI corresponding to an SS/PBCH block having a frequency resource other than the synchronization raster as the center frequency, the BS may always transmit the first type A DMRS in the third (or fourth) symbol in a slot.

According to Opt2, when it is difficult to use an additional 1 bit of the PBCH payload, the $N^{QCL}_{SSB}$ value may be signaled only by subCarrierSpacingCommon as shown in Table 17. Table 17 shows a merely example of signaling, and actual values corresponding to scs15or60 and scs30or120 may be replaced by any one of 1, 2, 4, and 8.

[Method #7A] When the PBCH payload indicates that the $N^{QCL}_{SSB}$ value is one of {1, 2, 4, 8} with a combination of 1 bit of subcarrierSpacingCommon and the LSB 1 bit of ssb-SubcarrierOffset (see Table 6), the LSB of $k_{SSB}$ may need to be defined. Specifically, the LSB of $k_{SSB}$ may be defined as 0 in the following cases: 1) when the center frequency of an SS/PBCH block is equal to the synchronization raster; 2) when the center frequency of the SS/PBCH block is equal to the channel raster; and 3) when the interval between the center frequency of the SS/PBCH block and the channel/synchronization raster is an integer multiple of 30 kHz. When the interval between the center frequency of the SS/PBCH block and the channel/synchronization raster is an integer multiple of 15 kHz (except for zero), the LSB of $k_{SSB}$ may be defined as '1'.

The interval of synchronization/channel rasters for the NR-U system in the 5 GHz band is all defined as an integer multiple of 30 kHz. Thus, if the carrier bandwidth is configured by considering the channel raster as the center frequency and if the SS/PBCH block and CORESET #0 are transmitted/configured in a part of the corresponding bandwidth (centered on the synchronization raster), the interval between the minimum RE (e.g., first subcarrier) of CORESET #0 and the minimum RE (e.g., first subcarrier) of the SS/PBCH block may be an integer multiple of 30 kHz. Specifically, the RE/RB level interval between the minimum RE of CORESET #0 and the minimum RE of the SS/PBCH block may be signaled by the PBCH payload. Here, the RE level interval may be expressed by 5 bits of $k_{SSB}$ (i.e., MSB 1 bit of 3 bits of the MIB used for candidate SSB indices in FR2+4 bits of ssb-SubcarrierOffset). The RB level interval may be signaled based on CORESET configuration tables as described in [Method #1A]. Specifically, a CRB grid may be created by considering as the reference point a point that is separated by the RE level interval corresponding to $k_{SSB}$ from the minimum RE of the SS/PBCH block, and the location of the minimum RE of CORESET #0 may be determined by applying the RB level offset in the CORESET #0 configuration to the reference point (see FIG. 11). In this case, considering that $k_{SSB}$ corresponds to signaling at an interval of 15 kHz (that is, the number of subcarriers based on SCS=15 kHz) and in the NR-U system, the interval between the minimum RE of CORESET #0 and the minimum RE of the SS/PBCH block (centered on the synchronization raster) satisfies an integer multiple of 30 kHz, the LSB 1 bit of ssb-SubcarrierOffset may always be '0'. Accordingly, the corresponding value may be used for other purposes, for example, to signal the value of $N^{QCL}_{SSB}$.

However, as described in [Method #6A], for the SS/PBCH block that is not centered on the synchronization raster (for the purpose of ANR), it may be necessary to find the location of CORESET #0 related thereto. In this case, (1) if the center frequency of the SS/PBCH block is the same as the channel raster and/or (2) if the interval between the center frequency of the SS/PBCH block and the channel/synchronization raster is an integer multiple of 30 kHz (e.g., 0, 30, 60, . . . ), the LSB of $k_{SSB}$ may also be defined as '0' (in the same way as when the SS/PBCH block is transmitted in the synchronization raster) (for example, $k_{SSB}$=00000, 00010, 00100, . . . ; xxxx0, where x=0 or 1). On the other hand, if the interval between the center frequency of the SS/PBCH block not centered on the synchronization raster and the channel/synchronization raster is not an integer multiple of 30 kHz but an integer multiple of 15 kHz (except for zero) (e.g., 15, 45, . . . ), the LSB of $k_{SSB}$ may be defined as '1' (for example, k_SSB=00001, 00011, . . . ; xxxx1, where x=0 or 1). This is because the interval between each RE of CORESET #0 and the channel raster may be maintained as an integer multiple of 30 kHz to align the grid of CORESET #0 with the channel raster. Therefore, if the interval between the center frequency of the SS/PBCH block not centered on the synchronization raster and the channel/synchronization raster is not an integer multiple of 30 kHz but an integer multiple of 15 kHz (except for zero), an odd value of $k_{SSB}$ may be signaled (i.e., LSB=1).

In other words, when the PBCH payload indicates that the $N^{QCL}_{SSB}$ value is one of {1, 2, 4, 8} with a combination of 1 bit of subcarrierSpacingCommon and the LSB 1 bit of ssb-SubcarrierOffset, If the interval between the center frequency of the SS/PBCH block and the channel/synchronization raster satisfies an integer multiple of 30 kHz (including zero), the LSB 1 bit of ssb-SubcarrierOffset (or $k_{SSB}$) may be assumed to be '0'.

On the other hand, if the interval between the center frequency of the SS/PBCH block and the channel/synchronization raster does not satisfy an integer multiple of 30 kHz (including zero) but satisfies an integer multiple of 15 kHz (except for zero), the LSB 1 bit of ssb-SubcarrierOffset (or $k_{SSB}$) may be assumed to be '1'. The above proposals may be summarized as follows in conjunction with Table 6.

Alternatively, $k_{SSB}$ may be defined as follows (see Table 19).

If the SS/PBCH block is detected on a licensed carrier: k_SSB=MSB 1 bit of 3 bits of MIB used for candidate SSB indices+4 bits of ssb-SubcarrierOffset.

If the SS/PBCH block is detected in an unlicensed carrier: k_SSB=MSB 1 bit of 3 bits of MIB used for candidate SSB indices+MSB 3 bits of ssb-SubcarrierOffset+X (where X=0 for case A or X=1 for case B; see Table 9).

Licensed and unlicensed carriers may be identified according to the frequency of the carrier in which the SS/PBCH block is detected, and the interval with the channel/synchronization raster may be predefined for each carrier (type) in specifications. The BS may transmit a PDCCH at the location of CORESET #0 based on $k_{SSB}$. Alternatively, even when the same frequency is used, the carrier type (licensed or unlicensed carrier) may vary depending on regions. In this case, the licensed and unlicensed carriers may be identified by different PBCH payloads or CRC values. To identify the carrier type at the corresponding frequency, a synchronization raster for the licensed band and a synchronization raster for the unlicensed band may be separately defined in specifications. Also, the BS may perform the operation of FIG. 9 based on the value of $N^{QCL}_{SSB}$.

Additionally, this method may be applied only when the MSB 2 bits of $k_{SSB}$ (that is, the MSB 1 bit of 3 bits of the MIB used for candidate SSB indices in FR2 and the MSB 1 bit of 4 bits of ssb-SubcarrierOffset) are not '11' in current Rel-15 NR. The reason for this is that in the Rel-15 NR system, when the value of $k_{SSB}$ is more than or equal to 24 (that is, when each of the MSB 2 bits of $k_{SSB}$ is '1'), the value of $k_{SSB}$ is used to inform the location of the nearest SS/PBCH block (including CORESET #0 information) because CORESET #0 is not provided in the corresponding SS/PBCH block as shown in Table 20. In other words, in the current Rel-15 NR system, if the MSB 2 bits of $k_{SSB}$ (that is, the MSB 1 bit of 3 bits of the MIB used for candidate SSB indices in FR2 and the MSB 1 bit of 4 bits of ssb-SubcarrierOffset) are '11' (even for unlicensed bands), the LSB of ssb-SubcarrierOffset may be set to the LSB of $k_{SSB}$ and then interpreted as in Table 20. On the other hand, if the MSB 2 bits of $k_{SSB}$ are '00', '10', or '01', the LSB of $k_{SSB}$ may be configured according to the present method. Alternatively, if the MSB 2 bits of $k_{SSB}$ are '11' (even for unlicensed band), the LSB of ssb-SubcarrierOffset may be set to the LSB of $k_{SSB}$ as in the current Rel-15 NR system. If the MSB 2 bits of $k_{SSB}$ are '00', '10' or '01', the LSB of $k_{SSB}$ may be always set to '0'. The location of the SS/PBCH block not centered on the synchronization raster (where the location of CORESET #0 needs to be found for the purpose of ANR) may be restricted so that the location is only a multiple of 30 kHz from the synchronization raster.

3) Receiver & Transmitter (Between Receiver and Transmitter)

Figure 21:
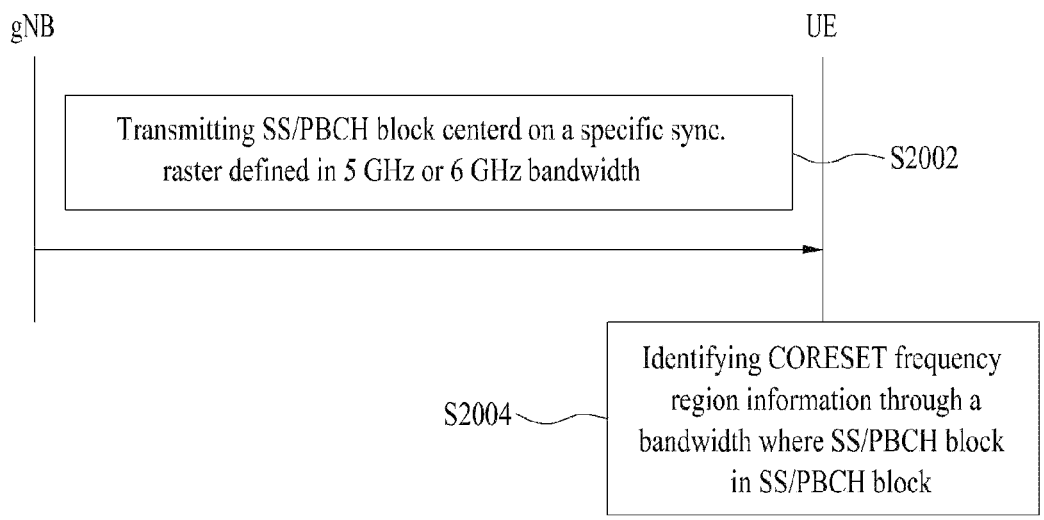

According to the proposals of the present disclosure, a BS operating in a bandwidth of 5 or 6 GHz may transmit an SS/PBCH block by considering as the center frequency a synchronization raster defined in the corresponding bandwidth and transmit information on frequency resources of CORESET #0 through the PBCH payload of the corresponding SS/PBCH block (S2102) as shown in FIG. 21. Upon receiving the SS/PBCH block, a UE may identify the frequency resource region of CORESET #0 by analyzing a bandwidth in which the SS/PBCH block is detected and/or the PBCH payload (e.g., CORESET configuration (pdcch-ConfigSIB1), $k_{SSB}$, or other information) of the SS/PBCH block (S2104). In addition, the UE may obtain information on a type0-PDCCH monitoring occasion by interpreting the PBCH payload (e.g., pdcch-ConfigSIB1) in the SS/PBCH block. Thereafter, the UE may receive a PDCCH in the frequency resource region of CORESET #0 on the type0-PDCCH monitoring occasion and obtain SI (e.g., SIB1) from a PDSCH scheduled by the corresponding PDCCH.

Figure 22:
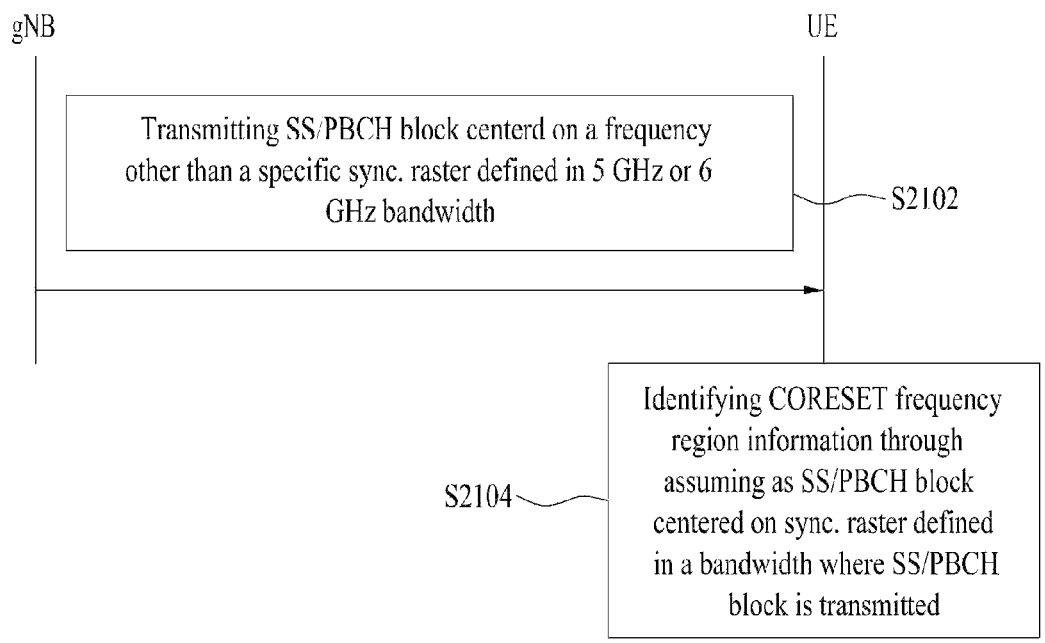

Alternatively, according to the proposals of the present disclosure, even when a BS transmits an SS/PBCH block having as the center frequency a frequency that is not defined as a synchronization raster in an unlicensed band for the purpose of ANR, the corresponding SS/PBCH block may carry information on CORESET #0 and/or information on a type0-PDCCH monitoring occasion (S2202) as shown in FIG. 22. When applying PBCH information obtained from the corresponding bandwidth and detected SS/PBCH block, a UE may assume that the received SS/PBCH block is an SS/PBCH block transmitted in a synchronization raster in a bandwidth to which the corresponding SS/PBCH block belongs and interpret that the corresponding SS/PBCH block is transmitted in the synchronization raster in order to obtain the information on CORESET #0 and/or the information on the type0-PDCCH monitoring occasion (S2204). Thereafter, the UE may receive a PDCCH in the frequency resource region of CORESET #0 on the type0-PDCCH monitoring occasion and obtain SI (e.g., SIB1) from a PDSCH scheduled by the corresponding PDCCH.

In the proposals of the present disclosure, the 5 or 6 GHz band may be replaced with an unlicensed band/UCell. In addition, the proposals of the present disclosure may be considered as methods of configuring/interpreting MIB information related to CORESET #0 differently according to the type of a frequency band (or cell) in which an SS/PBCH block is detected. For example, according to Method #1, a UE may obtain pdcch-ConfigSIB1 from an MIB after detecting an SS/PBCH block. Thereafter, the UE may interpret pdcch-ConfigSIB1 differently depending on whether the frequency band (or cell) in which the SS/PBCH block is detected is a licensed band/LCell or an unlicensed band/UCell. For example, the UE may interpret the MSB 4 bits of pdcch-ConfigSIB1 as follows.

TABLE 21

| Index | Licensed band/LCell | Unlicensed band/UCell |
|---|---|---|
| 0 | Offset0 for LCell | Offset0 for UCell |
| 1 | Offset1 for LCell | Offset1 for UCell |
| ... | ... | ... |
| 15 | Offset15 for LCell | Offset15 for UCell |

* Table 21 shows CORESET #0 configuration information. The CORESET #0 configuration information may further include, for example, at least one of a multiplexing pattern, the number of RB s, and/or the number of symbols. * An Offset for LCell and an offset for UCell may be configured independently. For example, the offset for LCell may be defined based on 3GPP TS 38.213 Tables 13-11 to 13-15, and the offset for UCell may be defined according to the proposals of the present disclosure in consideration of a channel/synchronization raster.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
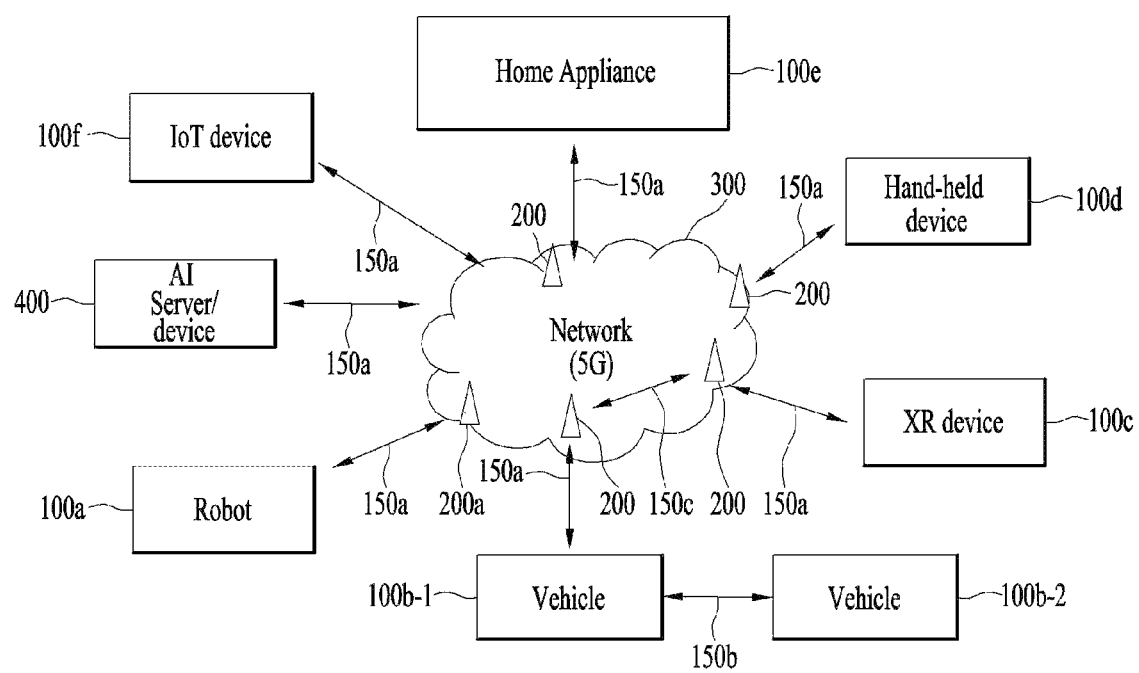
FIGS. 23 to 26 illustrate a communication system 1 and wireless devices, which are applied to the present disclosure.

FIG. 23 illustrates a communication system 1 applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
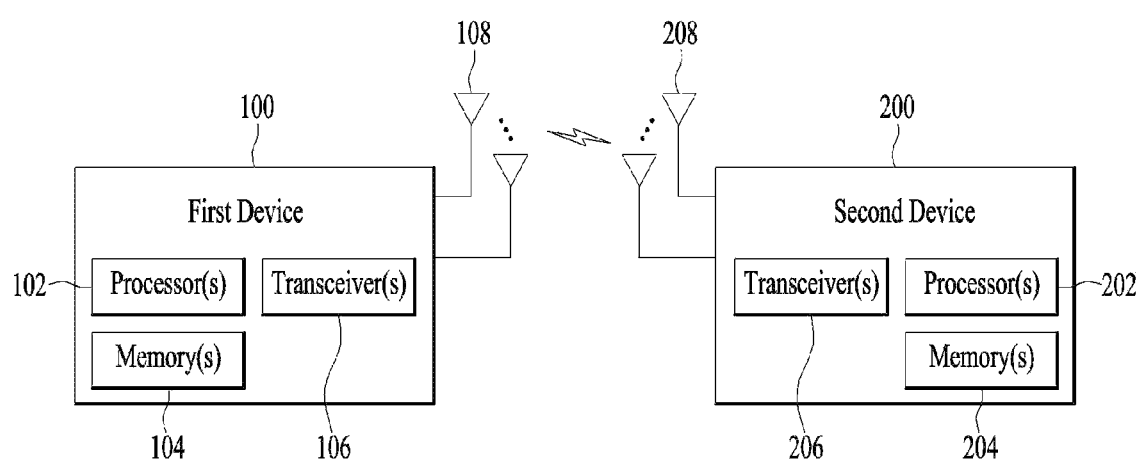

FIG. 24 illustrates wireless devices applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

Figure 25:
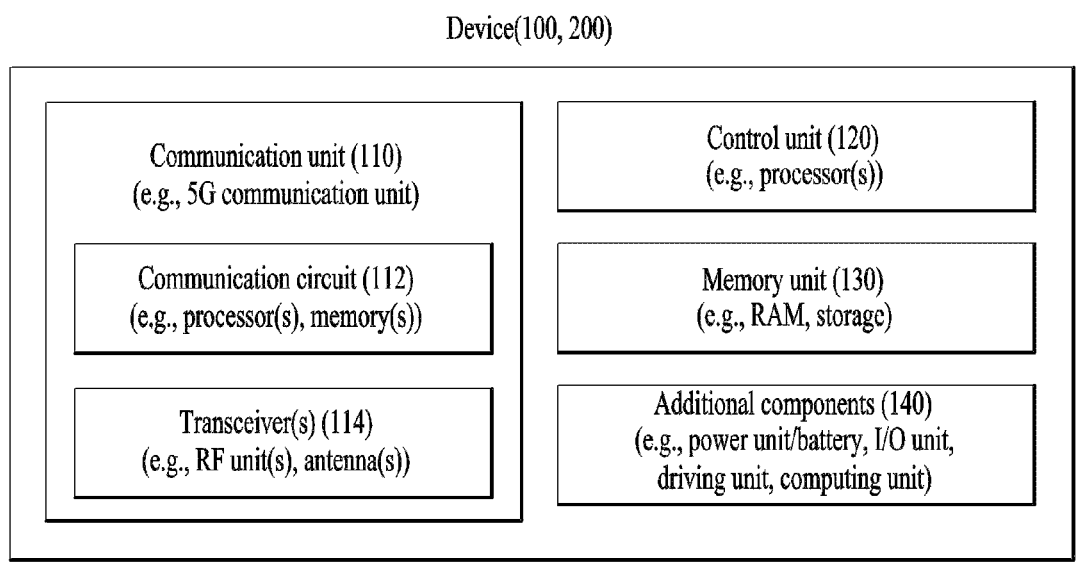

FIG. 25 illustrates another example of a wireless device applied to the present disclosure. The wireless device may be implemented in various forms according to a use-case/service (refer to FIG. 23).

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 26:
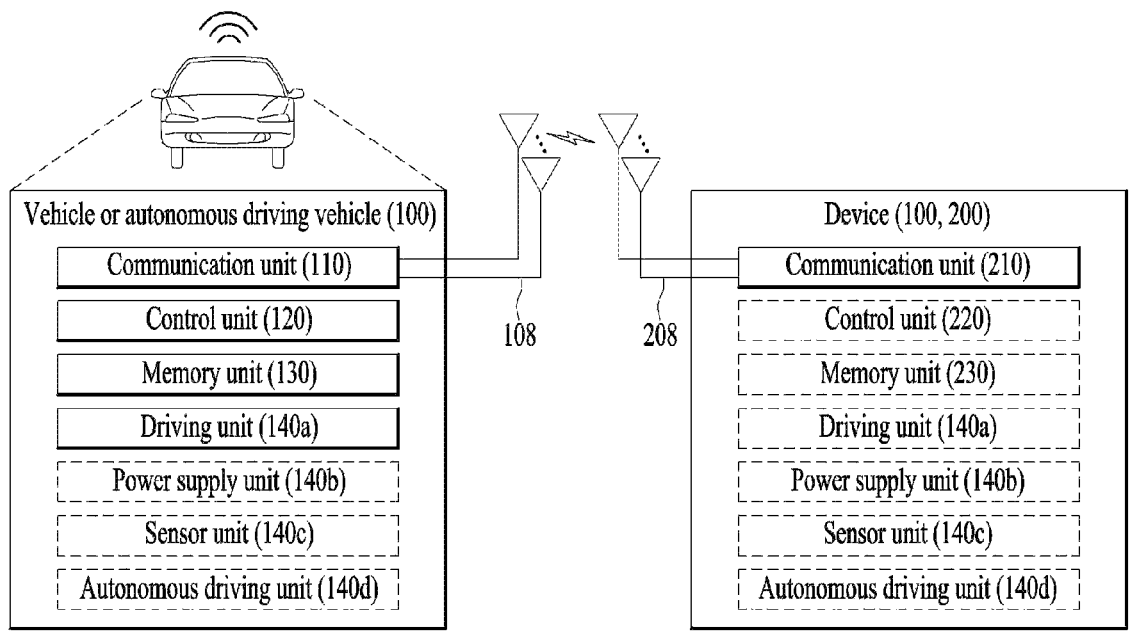

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to user equipments, base stations, or other devices in a wireless mobile communication system.

What is claimed is:

1. A method performed by a user equipment (UE) in a wireless communication system, the method comprising:
    detecting a synchronization signal/physical broadcast channel (SS/PBCH) block including 15 kHz subcarrier spacing-based offset information;
    determining a control resource set (CORESET) for Type0-physical downlink control channel (PDCCH) common search space (CSS) set based on the SS/PBCH block,
    wherein a subcarrier offset between the CORESET for Type0-PDCCH CSS set and the SS/PBCH block is determined based on the 15 kHz subcarrier spacing-based offset information;
    monitoring the CORESET for Type0-PDCCH CSS set, wherein, based on the SS/PBCH block detected in a shared spectrum, a frequency of the SS/PBCH block is separated from a synchronization raster by k*30 kHz, where k is an integer greater than or equal to zero, and one least significant bit (LSB) of the subcarrier offset is '0'.

2. The method of claim 1,
wherein the subcarrier offset indicates a multiple of 30 kHz.

3. The method of claim 1,
wherein 4 LSBs of the subcarrier offset are determined based on a higher-layer parameter, ssb-SubcarrierOffset.

4. The method of claim 1,
wherein based on the SS/PBCH block being detected in the shared spectrum, the one LSB of the 15 kHz subcarrier spacing-based offset information is used to identify SS/PBCH block candidates in a quasi-co-location (QCL) relationship.

5. A user equipment (UE) for use in a wireless communication system, the UE comprising:
at least one processor; and
at least one computer memory operably connected to the at least one processor and configured to, when executed, cause the at least one processor to perform operations comprising:
detecting a synchronization signal/physical broadcast channel (SS/PBCH) block including 15 kHz subcarrier spacing-based offset information;
determining a control resource set (CORESET) for Type0-physical downlink control channel (PDCCH) common search space (CSS) set based on the SS/PBCH block,
wherein a subcarrier offset between the CORESET for Type0-PDCCH CSS set and the SS/PBCH block is determined based on the 15 kHz subcarrier spacing-based offset information;
monitoring the CORESET for Type0-PDCCH CSS set,
wherein, based on the SS/PBCH block detected in a shared spectrum, a frequency of the SS/PBCH block is separated from a synchronization raster by k*30 kHz, where k is an integer greater than or equal to zero, and one least significant bit (LSB) of the subcarrier offset is '0'.

6. The UE of claim 5,
wherein the subcarrier offset indicates a multiple of 30 kHz.

7. The UE of claim 5,
wherein 4 LSBs of the subcarrier offset are determined based on a higher-layer parameter, ssb-SubcarrierOffset.

8. The UE of claim 5,
wherein based on the SS/PBCH block being detected in the shared spectrum, the one LSB of the 15 kHz subcarrier spacing-based offset information is used to identify SS/PBCH block candidates in a quasi-co-location (QCL) relationship.

* * * * *